US011504656B2

(12) United States Patent
Sander et al.

(10) Patent No.: US 11,504,656 B2
(45) Date of Patent: Nov. 22, 2022

(54) OIL FILTER AND FILTER CARTRIDGE FOR AN OIL FILTER OF A MOTOR VEHICLE

(71) Applicant: Daimler AG, Stuttgart (DE)

(72) Inventors: Markus Sander, Merzig (DE); Lionel Le Clech, Stuttgart (DE); Thomas Seemueller, Ensingen (DE); Eric Schumacher, Bingen (DE); Michael Hoffmann, Weinstadt (DE); Philipp Boehning, Stuttgart (DE); Kai Knoll, Stuttgart (DE)

(73) Assignee: Daimler AG, Stuttgart (DE)

( * ) Notice: Subject to any disclaimer, the term of this patent is extended or adjusted under 35 U.S.C. 154(b) by 1013 days.

(21) Appl. No.: 15/778,183

(22) PCT Filed: Nov. 17, 2016

(86) PCT No.: PCT/EP2016/001914
§ 371 (c)(1),
(2) Date: May 22, 2018

(87) PCT Pub. No.: WO2017/088962
PCT Pub. Date: Jun. 1, 2017

(65) Prior Publication Data
US 2018/0333664 A1      Nov. 22, 2018

(30) Foreign Application Priority Data
Nov. 28, 2015    (DE) .................... 102015015370.6

(51) Int. Cl.
*B01D 35/153*      (2006.01)
*B01D 35/147*      (2006.01)
(Continued)

(52) U.S. Cl.
CPC ......... *B01D 35/153* (2013.01); *B01D 27/103* (2013.01); *B01D 29/114* (2013.01);
(Continued)

(58) Field of Classification Search
None
See application file for complete search history.

(56) References Cited

U.S. PATENT DOCUMENTS

| 6,685,829 B1 | 2/2004 | Baumann et al. |
| 9,023,203 B2 | 5/2015 | Ardes |

(Continued)

FOREIGN PATENT DOCUMENTS

| DE | 10 2009 054 523 A1 | 6/2011 |
| DE | 10 2012 000 878 B3 | 3/2013 |

(Continued)

OTHER PUBLICATIONS

German-language European Office Action issued in European application No. 16 798 089.5-1104 dated Apr. 14, 2020 (Four (4) pages).

(Continued)

*Primary Examiner* — Jonathan M Peo
(74) *Attorney, Agent, or Firm* — Crowell & Moring LLP

(57) ABSTRACT

An oil filter for a motor vehicle has a filter cartridge which is disposed in an oil filter housing of the oil filter. The filter cartridge has a channel for filtered oil which is surrounded at least regionally by a filter material in the radial direction. At least one through opening is formed in a wall of the channel. An emergence of filtered oil via the at least one through opening into a channel for the filtered oil provided on sides of the oil filter housing is preventable by bringing the filter cartridge into a first position. An inlet into the channel provided on sides of the oil filter housing fluidically connectable to the at least one through opening by bringing the filter cartridge into a second position in which the filter cartridge is shifted relative to the first position in an axial direction.

8 Claims, 14 Drawing Sheets

(51) Int. Cl.
  *B01D 35/16* (2006.01)
  *B01D 29/96* (2006.01)
  *B01D 27/10* (2006.01)
  *B01D 29/11* (2006.01)
  *B01D 35/00* (2006.01)

(52) U.S. Cl.
  CPC ........... *B01D 29/96* (2013.01); *B01D 35/005* (2013.01); *B01D 35/147* (2013.01); *B01D 35/16* (2013.01); *B01D 2201/167* (2013.01); *B01D 2201/291* (2013.01); *B01D 2201/305* (2013.01); *B01D 2201/347* (2013.01); *B01D 2201/4084* (2013.01)

(56) References Cited

U.S. PATENT DOCUMENTS

| | | |
|---|---|---|
| 2004/0232063 A1 | 11/2004 | Cline et al. |
| 2009/0314697 A1 | 12/2009 | Ardes |
| 2012/0267293 A1* | 10/2012 | Ardes .................. B01D 35/147 210/109 |
| 2014/0366494 A1* | 12/2014 | Ardes .................... B01D 29/96 55/314 |

FOREIGN PATENT DOCUMENTS

| | | |
|---|---|---|
| DE | 10 2012 210 834 A1 | 1/2014 |
| EP | 2 644 242 A1 | 10/2013 |
| JP | 2-6805 A | 1/1990 |
| JP | 2003-508210 A | 3/2003 |
| JP | 2003-320206 A | 11/2003 |
| JP | 2004-346929 A | 12/2004 |
| JP | 2007-303429 A | 11/2007 |
| JP | 2008-223736 A | 9/2008 |
| JP | 2009-536088 A | 10/2009 |
| JP | 2013-513750 A | 4/2013 |
| WO | WO 2005/007267 A1 | 1/2005 |
| WO | WO 2012/085193 A1 | 6/2012 |
| WO | WO 2013/134841 A1 | 9/2013 |

OTHER PUBLICATIONS

PCTIEP2016/001914, International Search Report dated Feb. 16, 2017 (Two (2) pages).
Japanese Office Action issued in Japanese counterpart application No. 2018-527225 dated Apr. 23, 2019, with partial English translation (Thirteen (13) pages).
Korean Office Action issued in Korean counterpart application No. 10-2018-7014863 dated Jun. 21, 2019, with partial English translation (Ten (10) pages).

* cited by examiner

OIL FILTER AND FILTER CARTRIDGE FOR AN OIL FILTER OF A MOTOR VEHICLE

BACKGROUND AND SUMMARY OF THE INVENTION

The invention relates to an oil filter having an oil filter housing in which a filter cartridge is arranged. Furthermore, the invention relates to a filter cartridge for inserting into the oil filter housing of the oil filter of a motor vehicle. The filter cartridge has a channel for filtered oil, which is surrounded at least regionally in a radial direction by a filter material of the filter cartridge.

DE 10 2012 000 876 B3 describes an oil filter having a filter head onto which a housing pot is screwed, wherein a filter element is arranged in the housing pot, the filter element not being shiftable in an axial direction of the filter element when the oil filter is closed.

WO 2013/134841 A1 describes an oil pump and an oil filter for internal combustion engines. Here, a check valve is arranged in a supply channel for unfiltered oil, via which supply channel the unfiltered oil reaches a region of the oil filter in which there is a filter device. When operating the oil pump, the check valve is opened or pushed open. After shutting off the oil pump, a spring of the check valve presses a sealant against a valve seat. This prevents the oil from passing back into the oil pump and thus into a crankcase of the internal combustion engine. Furthermore, a pressure relief valve is provided in the region of the filter, in which the filter device is arranged, the pressure relief valve opening when the filter device is blocked.

Furthermore, EP 2 644 242 A1 describes an oil filter with which a filter cartridge is arranged in an oil filter housing. A safety valve opens when the filter material of the filter cartridge is blocked. Here, a closing body of the safety valve is a component of the filter cartridge. A spring, which is arranged on the oil filter housing, presses the closing body of the safety valve against a valve seat when the filter cartridge is installed in the oil filter housing and a cover of the oil filter housing is closed.

The check valve known from the prior art prevents the oil circuit from running dry when the internal combustion engine stops. This is based on the knowledge that all bearings of the internal combustion engine are to be supplied with oil having a certain pressure so that the lubrication of the bearings functions well. However, in order to be able to construct a corresponding oil pressure, it is necessary that the oil circuit be filled with oil and not with air. If there is no check valve provided, then the shutting off of the internal combustion engine causes the oil circuit to run dry for the most part. The check valve thus helps to retain oil volumes in the oil circuit even when the internal combustion engine stops. When the oil pressure can then only be constructed with a delay, namely because of air in the oil circuit, this leads to a lack of or inadequate lubrication. A lack of lubrication can, however, lead to damage to the bearings or damage to the motor. An inadequate lubrication means a higher degree of wear. If the bearings of the internal combustion engine wear, then this leads to a reduction of the lifespan of the internal combustion engine. In the worst case, this can even lead to premature damage to the motor.

However, the pressure relief valve or safety valve, which is also call a by-pass valve, opens a by-pass in the event of blocked filter material. The oil then no longer flows through the filter material; however, an emergency supply of the internal combustion engine is at least ensured with unfiltered oil.

With the arrangement of such valves in oil filters known from the prior art, it is typically provided that either the valve seat or the valve piston or the valve stem is applied to the filter cartridge and the respective counterpart to the oil filter housing. However, providing such valves leads to a comparatively high number of components and a comparatively high complexity of the oil filter.

The object of the present invention is to thus create a filter cartridge of the type mentioned at the start and an oil filter having such a filter cartridge by means of which or with which at least one valve function is provided in a simplified manner.

The oil filter according to the invention for a motor vehicle comprises a filter cartridge and an oil filter housing, in which the filter cartridge is arranged. The filter cartridge has a channel for filtered oil. The channel is at least regionally surrounded in a radial direction by a filter material of the filter cartridge. At least one through opening is formed in a wall of the channel. The oil filter housing comprises a base body and a covering element. The filter cartridge can be removed from the oil filter housing with the covering element removed from the base body.

Furthermore, the filter cartridge in the closed oil filter housing, in which the covering element is mounted on the base body, can be moved from a first position, in which an emergence of filtered oil via the at least one through opening into a channel provided on sides of the oil filter housing for the filtered oil is prevented, into a second position. In the second position, the filter cartridge is shifted in an axial direction of the filter cartridge in relation to the first position. In the second position, an inlet into the channel provided on sides of the oil filter housing is fluidically connected to the at least one through opening. Thus, in a particularly simple manner, a check valve is provided by combining the filter cartridge with the oil filter housing.

The filter cartridge has a closing element that can be shifted relative to a first end plate of the filter cartridge in the axial direction of the filter cartridge. An outlet channel can be closed by means of the closing element, the outlet channel being provided for removing the oil from the receiving region of the oil filter housing for the filter cartridge. Here, an inlet of the outlet channel can be released by bringing the filter cartridge into a dismantling position of the filter cartridge. In the dismantling position, the filter cartridge is moved out of the first position in a direction opposite to the second position. Correspondingly, a service valve is provided by the closing element in conjunction with the outlet channel. With an open service valve and thus released inlet of the outlet channel, it can be guaranteed when changing the oil that all the used oil is removed from the internal combustion engine. Thus, the filter cartridge can be changed without an oil spillage.

The filter cartridge according to the invention, which can be inserted into the oil filter housing of the oil filter, has the channel for filtered oil. The channel is at least regionally surrounded in a radial direction by the filter material of the filter cartridge. The at least one through opening is formed in the wall of the channel. By bringing the filter cartridge into the first position, an emergence of filtered oil via the at least one through opening into the channel for the filtered oil can be prevented, which is provided on sides of the oil filter housing. By bringing the filter cartridge into the second position, in which the filter cartridge is shifted in an axial direction of the filter cartridge relative to the first position, the inlet into the channel provided on sides of the oil filter housing can be fluidically connected to the at least one through opening. The filtered oil cannot thus flow through the at least one through opening in the wall of the channel of the filter cartridge in the first position of the filter cartridge and further reach the channel provided on sides of the oil filter housing. In contrast, the fluid connection between the channel of the filter cartridge and the channel provided on sides of the oil filter housing can be produced by the filter cartridge being brought into the second position. With fluid connection of the at least one through opening having the inlet of the channel provided on sides of the oil filter housing, the filtered oil can correspondingly flow through the at least one through opening and reach the channel via the inlet, the channel being provided on sides of the oil filter housing for the filtered oil.

The filter cartridge has the closing element that can be shifted relative to the first end plate of the filter cartridge in the axial direction of the filter cartridge. The outlet channel can be closed by means of the closing element, the outlet channel being provided for removing the oil from the receiving region of the oil filter housing for the filter cartridge. Here, the inlet of the outlet channel can be released by bringing the filter cartridge into the dismantling position of the filter cartridge. In the dismantling position, the filter cartridge is moved out of the first position in a direction opposite to the second position. Correspondingly, a service valve is provided by the closing element in conjunction with the outlet channel. With an open service valve and thus released inlet of the outlet channel, it can be guaranteed when changing the oil that all the used oil is removed from the internal combustion engine. Thus, the filter cartridge can be changed without an oil spillage.

The filter cartridge can thus be shifted in the oil filter housing in the axial direction of the filter cartridge, which coincides with the axial direction of the channel of the filter cartridge. This shifting direction further corresponds to a direction in which the filter cartridge is inserted or pushed into the oil filter housing when installing the filter cartridge in the oil filter housing.

In other words, the filter cartridge is swimmingly mounted in the oil filter housing. This means that the filter cartridge can be moved axially along a defined travel path or shifting path in the oil filter housing. As a result of this movement of the filter cartridge in the axial direction, it can be ensured that the at least one through opening, which is formed in the wall of the channel of the filter cartridge, is fluidically connected to the inlet in the channel provided on sides of the oil filter housing. In this second position of the filter cartridge, the filtered oil can thus emerge from the channel of the filter cartridge into the channel for the filtered oil provided on sides of the oil filter housing. In contrast, if the filter cartridge is in the first position, then oil cannot flow through the at least one through opening in the wall of the channel of the filter cartridge. Correspondingly, the emergence of the filtered oil into the channel provided on sides of the oil filter housing can be prevented by bringing the filter cartridge into the first position.

A check valve is thus provided by the axially shiftable filter cartridge, in which the at least one through opening is provided in the wall of the channel, in conjunction with the channel provided on sides of the oil filter housing. When specifically the oil pressure of an oil pump in operation of the oil filter shifts the filter cartridge into the second position, then the filtered oil can reach the channel provided on sides of the oil filter housing. The filtered oil is then available for lubricating an internal combustion engine of the motor vehicle.

The provision of the check valve is particularly simple; namely, presently, there is no need for an actuation element that can be moved relative to the filter cartridge and is susceptible to wear in order to open the check valve. Instead, the movement of the whole filter cartridge in the axial direction leads to opening the check valve. Thus, the check valve is provided by few components and with particularly low complexity of the oil filter.

Thus, the loss of pressure via the filter cartridge can presently be used to generate or cause the axial movement of the filter cartridge. The difference in pressure of the unfiltered oil on the filter cartridge in comparison to the pressure of the filtered oil on the filter cartridge is thus used to press open the check valve.

It is preferred when the oil pump no longer constructs any pressure, i.e., when shutting off the internal combustion engine, the filter cartridge is shifted into the first position. This can be caused by a spring element which can be arranged on sides of the oil filter housing and/or on sides of the filter cartridge. In this first position of the filter cartridge, the prevention of the through flow of the at least one through opening in the wall of the channel of the filter cartridge ensures that the pressure in the oil circuit is maintained and, thus, that the oil circuit does not run empty. Correspondingly, a valve function is provided by the axially shiftable filter cartridge in a simplified manner, namely the function of a check valve. As a result of the filter cartridge itself being designed as a shiftable valve piston, a reduction of the number of components, the weight and the complexity of the oil filter having the filter cartridge can be achieved. Furthermore, advantages in terms of the construction space to be provided for the oil filter can thus be achieved.

With check valves known from prior art in the oil circuit, depending on the installation position of the check valve, it can lead to at least the pure oil side of the region of the oil filter in which the filter cartridge is found running empty. This leads to the development of pressure in the oil taking longer when starting the internal combustion engine than is desirable. As a result of this emptying presently being prevented, an increased amount of oil retained in the oil circuit emerges. This leads to a particularly quick development of oil pressure after the start of the internal combustion engine of the motor vehicle.

The reduced number of components to be provided relates, on the one hand, to the individual parts of the different valves, such as the check valve and the by-pass valve, for example. Furthermore, a support dome, which is provided with oil filters known from the prior art, is not necessary to retain oil, which is in the region of the filter cartridge, in the oil filter when the internal combustion engine stops. Furthermore, by providing a plurality of through openings in the wall of the channel of the filter cartridge, a particularly large cross-section that can be flowed through, i.e., an increased valve cross-section, can be supplied. This reduces the loss of pressure caused by the oil filter and in particular by the filter cartridge when the oil filter is in operation. Since the oil pump is typically driven by means of the internal combustion engine, the reduced loss of pressure also leads to a reduction of the fuel consumption of the internal combustion engine. Fuel economy is accompanied by a high cost-to-use ratio.

As a result of the components or component groups not being necessary or corresponding function carriers being able to be integrated into the oil filter housing, a cost reduction furthermore emerges. Furthermore, a cost-effective and robust solution is provided which is particularly suitable for use in series production, in particular large-scale series production.

Indeed presently, the medium used for lubricating the internal combustion engine of the motor vehicle is called oil; however, a use of the filter cartridge for other media, in particular for lubricants other than oil, is also possible.

Preferably, an inlet for unfiltered oil into a channel can be released by bringing the filter cartridge into a third position in which the filter cartridge is further shifted in the axial direction relative to the second position. The inlet can be closed by bringing the filter cartridge into the first position and by bringing the filter cartridge into the second position. Correspondingly, in the third position of the filter cartridge, unfiltered oil can reach the channel, whose inlet is released. Correspondingly, a by-pass valve or discharge valve or pressure relief valve is provided by shifting the filter cartridge into the third position.

This by-pass valve ensures that at least unfiltered oil can reach the internal combustion engine of the motor vehicle when filter material of the filter cartridge is blocked. In the first and in the second position of the filter cartridge, this inlet for the unfiltered oil is not released, instead it is closed. Thus, it is ensured that no unfiltered oil reaches the channel when the internal combustion engine is shut off and when the internal combustion engine is running if the filter material of the filter cartridge is not added or is blocked.

The channel of the filter cartridge can have a first region, which abuts on the first end plate of the filter cartridge and in which the at least one through opening is formed. The channel of the filter cartridge can further have a second region, in which the inlet for the unfiltered oil into the channel is provided by at least one further through opening. The unfiltered oil can be introduced into the channel of the filter cartridge via the at least one further through opening by bringing the filter cartridge into the third position. Correspondingly, in this embodiment, the channel of the filter cartridge can thus be flowed through by both filtered oil and—when the by-pass valve is open—by unfiltered oil. However, the unfiltered oil can only reach this channel when the filter cartridge is shifted into the third position.

Shifting the filter cartridge from the second position into the third position preferably takes place against the spring force of a spring element. Here, the spring force preferably applies a pressure to the filter cartridge, which is substantially greater than the operating pressure acting when the filter material is not blocked or added, the operating pressure shifting the filter cartridge from the first position into the second position.

Preferably, the second region is formed as a tubular socket closed on an end side, wherein at least one sealing element is arranged on an outside of the socket. Preferably, sealing elements are arranged here on the outside of the socket on both sides of the at least one further through opening—when seen in the movement direction of the filter cartridge when moving this from the first position into the second position. By providing such radial seals, it can be ensured in a particularly simple and reliable manner that unfiltered oil only flows through the further through opening when the filter cartridge is shifted into the third position.

In the dismantling position, the closing element is correspondingly spaced apart from the outlet channel. In particular, the filter cartridge can be held in the dismantling position on a covering element of the oil filter housing. To do so, claws or similar holding elements can be provided on the filter cartridge that can interact with claws or similar holding elements provided on sides of the covering element. The length of the claws of the filter cartridge and the covering element is here calculated in such a way that the axial shiftability of the filter cartridge from the first position into the second position and from the second position into the third position is guaranteed.

The closing element can be formed as a sleeve element, which delimits a receiving space. The receiving space is formed between a first region of the channel of the filter cartridge having the at least one through opening and the sleeve element. Here, the sleeve element has at least one through opening via which the unfiltered oil can be introduced into the receiving space. The unfiltered oil can be introduced into the channel provided en sides of the oil filter housing in the third position of the filter cartridge.

In such an embodiment, the function of the by-pass valve or pressure relief valve can be provided, in particular by providing seals pressed against a corresponding contact surface in the axial direction (i.e., in the axial direction of the filter cartridge). Such axial seals provide for a particularly wear resistant, reliable and functionally safe seal when the valve is closed.

The sleeve element can be shiftable in particular along a wall of the filter cartridge protruding from the first end plate of the filter cartridge. A particularly exact and reliable guide of the sleeve element when shifting it can be ensured by such a wall, in particular also formed as a sleeve.

A spring element for shifting the closing element is preferably provided on sides of the filter cartridge. Correspondingly, a spring element can be arranged on the filter cartridge, by means of which spring element the closing element is supplied with a spring force of the spring element in a position closing the inlet of the outlet channel. This spring element for moving the closing element is exchanged together with the filter cartridge when the filter cartridge is replaced. Thus, a seal of the spring element can be accounted for particularly well.

The spring element can be formed in particular from a plastic. As a result, it is possible to lead the whole filter cartridge including the spring element to disposal by combustion. This is because, here, the spring element formed from the plastic also combusts. This reduces the expenditure when disposing of the used filter cartridge.

Furthermore, the closing element preferably has at least one sealing element which is provided for sealing the inlet of the outlet channel. Then, specifically this at least one sealing element acting in the axial direction is exchanged when exchanging the filter cartridge. Correspondingly, a closure of the sealing element for sealing the inlet of the outlet channel can thus also be accounted for in a simplified manner.

It has been shown to be further advantageous when a sealing element is arranged on an outside of a region of the channel of the filter cartridge, which has the at least one through opening. The sealing element circulates around the region of the channel in the radial direction. The sealing element is arranged downstream of the at least one through opening when seen in a current direction of the filtered oil through the channel of the filter cartridge. For example, the sealing element can be provided by at least one O-ring seal. As a result of such a radial seal, it can be ensured in a particularly simple manner that filtered oil only reaches the channel provided on sides of the oil filter housing for the filtered oil during normal operation, i.e., with not (yet) blocked or added filter material.

With a corresponding design of the spring elements of the oil filter, it can be provided that the filter cartridge does not swing during operation, i.e., no rapidly alternating movements in the axial direction of the filter cartridge emerge. Furthermore, to do so, defined intermediary stops are preferably provided in the respective positions of the filter cartridge. Moreover, attenuating volumes with through openings or bores acting as restrictors can be provided on sides of the filter cartridge and/or on sides of the oil filter housing. This also serves for the avoidance of an axial swing of the filter cartridge.

The advantages and preferred embodiments described for the filter cartridge according to the invention are also valid for the oil filter according to the invention and vice versa.

Here, a spring element preferably causes the shifting of the filter cartridge from the second position into the first position when an internal combustion engine of the motor vehicle is switched off. On the other hand, when the internal combustion engine is running, an oil pump causes the shifting of the filter cartridge from the first position into the second position against the pressure of this spring element. Here, the stroke or the path of the shifting of the filter cartridge in the axial direction is a result of the pressure difference of the oil pressing on respective regions of the filter cartridge, taking the spring force applied by the spring element into consideration.

A simplification, in particular in terms of the provision of the different valve functions, is achieved by such an oil filter. This particularly applies for the integration of the check valve in the filter cartridge of the filter element. However, both the functions of the check valve and the service valve and of the by-pass valve are preferably carried out in an integrated manner in a valve piston in the form of the filter cartridge that is axially shiftable, i.e., swimmingly mounted. Advantages in terms of a combination of the filtrations of the oil caused by the filter cartridge and the valve control can be achieved by the filter cartridge moveably or swimmingly mounted in the axial direction.

Preferably, the oil filter housing has a tubular receiver in which a first region of the channel of the filter cartridge having the at least one through opening is received when the filter cartridge is brought into the first position or into the second position. The first region of the channel abuts on a closing device at least in the first position and in the second position of the filter cartridge. The closing device can be moved away from the tubular receiver by shifting the filter cartridge from the first position into the second position in order to release the inlet into the channel provided on sides of the oil filter housing. The pressure difference between the unfiltered oil and the filtered oil on the pure oil side of the filter material leads to releasing the inlet into the channel provided on sides of the oil filter housing during operation of the oil filter, i.e., when the internal combustion engine is running and thus when the oil pump is powered, by the filter cartridge shifting the closing device.

Here, the filter cartridge can shift the closing device against the spring force of a spring element. A defined intermediary stop is provided when moving the filter cartridge as a result of the first region of the channel of the filter cartridge abutting on the closing device. This makes the provision of the at least one valve function particularly reliable.

Preferably, the oil filter housing has a stop for a spring element which exerts a spring force acting in opposition to the shifting direction on the filter cartridge when the filter cartridge is brought into a third position, in which the filter cartridge is shifted even further in the axial direction relative to the second position. The spring force, which is to be overcome, can be specifically applied by such a spring element in order to cause the opening of the by-pass valve.

Here, an inlet for unfiltered oil into a channel can be released by a movement of the tubular receiver away from a wall of the oil filter housing. Correspondingly, the inlet into the channel can be released by the movement of the receiver away from the wall. The movement of the receiver away from the wall can be caused, for example, by the tubular wall abutting on an end plate of the filter cartridge and there being an increased pressure on the side of the unfiltered oil in comparison to the pressure on the pure oil side of the filter cartridge because of the added or blocked filter material. Correspondingly, the filter cartridge then shifts the tubular receiver away from the wall of the oil filter housing. An intermediary stop, which is beneficial for reliably shifting the filter cartridge, is provided here by the tubular receiver abutting on the end plate of the filter cartridge.

Additionally or alternatively, an inlet for unfiltered oil into a channel can be released by moving a second region of the channel of the filter cartridge having at least one further through opening out of a further tubular receiver for the second region of the channel provided on sides of the covering element. The further tubular receiver for the second region of the channel can have an inflow opening, in particular, for unfiltered oil. In this way, variations in the pressure of the unfiltered oil do not directly cause a shifting of the filter cartridge. Instead, the flow of the unfiltered oil through the at least one inflow opening in the tubular receiver provides attenuation. The at least one inflow opening thus serves as a restrictor which prevents an axial swing of the filter cartridge.

Finally, it has been shown to be advantageous when the oil filter housing has the outlet channel, wherein the inlet of the outlet channel is closed by means of the closing element that can be shifted relative to the first end plate of the filter cartridge in the axial direction of the filter cartridge when the filter cartridge is in the first position or in the second position. A service valve can be provided in conjunction with the closing element by the provision of such an outlet channel in particularly simple manner.

The features and combinations of features specified in the description above and the features and combinations of features specified in the description of the figures and/or in the figures only below can be used not only in the combination specified in each case, but also in other combinations or on their own without exceeding the scope of the invention. Thus, embodiments are also to be considered as being included and disclosed by the invention which are not explicitly shown or explained in the figures, but which arise and can be produced by separate feature combinations from the described embodiments. Thus, embodiments and feature combinations are to be viewed as disclosed which do not have all the features of an originally formulated independent claim. Furthermore, embodiments and feature combinations are to be seen as disclosed, in particular by the embodiments explained above, that are based on the feature combinations explained with reference to the claims or deviate from these.

Further advantages, features and details of the invention arise from the claims, the description of preferred embodiments below and with the aid of the drawings.

DETAILED DESCRIPTION OF THE DRAWINGS

Figure 1:
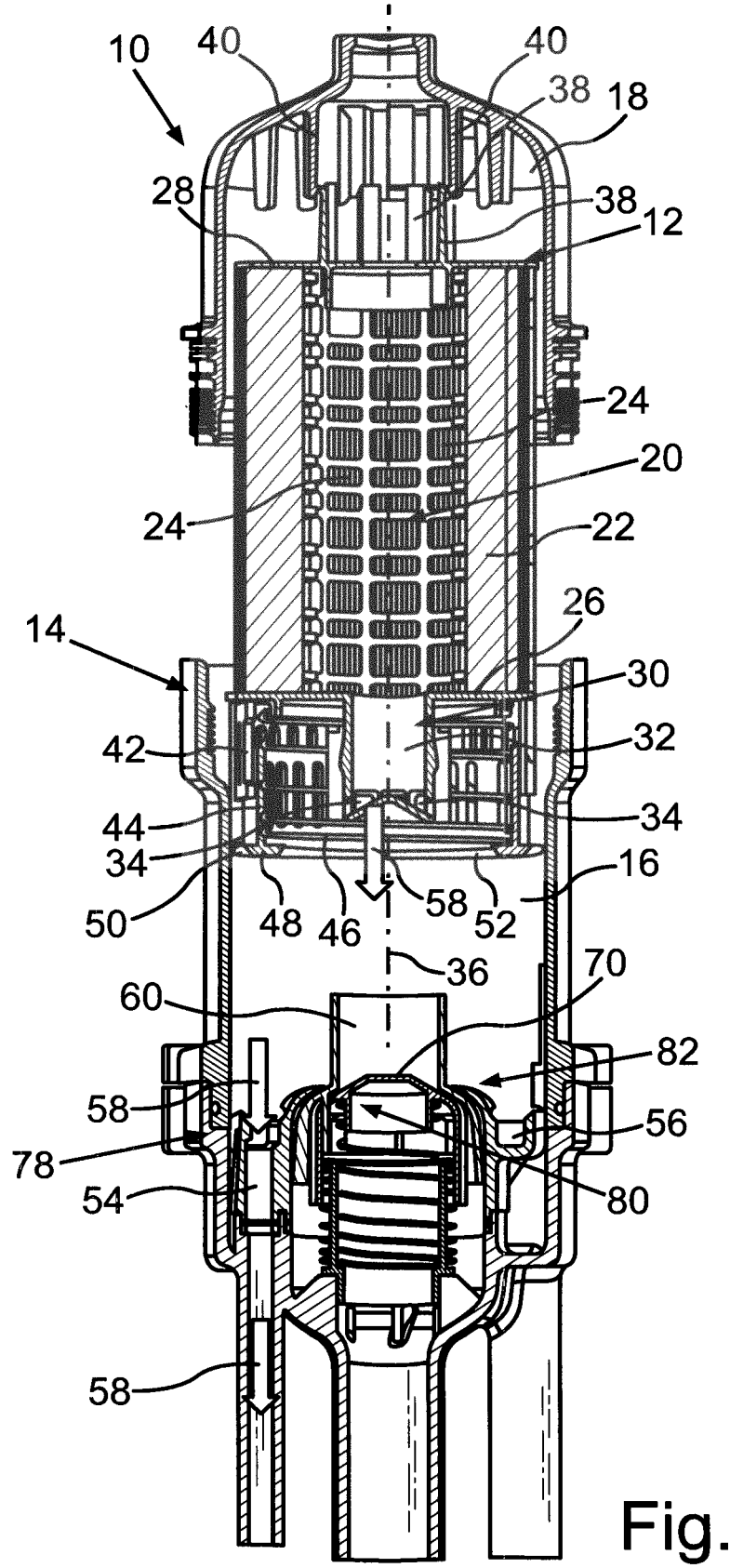
FIG. 1 illustrates an oil filter of a motor vehicle in a sectional view, wherein an oil filter housing of the motor vehicle is open and a filter cartridge is installed in the oil filter housing.

FIG. 1 shows an oil filter 10 for a motor vehicle in a sectional view, which can be a utility vehicle in particular. However, a filter cartridge 12 of the oil filter 10 which is also shown in sections in FIG. 1 can also be used for an oil filter of a passenger motor vehicle (presently not shown). The oil filter 10 comprises an oil filter housing 14, which comprises a base body 16 and a cover 18 or a covering element. In order to change the filter cartridge 12, the cover 18 is dismantled or removed from the base body 16, as is illustrated in FIG. 1.

The filter cartridge 12 has a channel 20 which is surrounded in the radial direction by a filter material 22. The filter material 22 can be formed as a fluted filter, for example. The channel 20 is formed to be tubular and has a plurality of cavities 24 in the region in which it is surrounded by the filter material 22. The oil filtered by means of the filter material 22 can reach the channel 20 via these cavities 24. The unfiltered oil correspondingly travels in a radial direction, i.e., from outside through the filter material 22, and thus reaches the channel 20.

The channel 20 is surrounded by the filter material 22 in a region between a first lower end plate 26 according to FIG. 1 and a second upper end plate 28 according to FIG. 1. In a region 30 adjoining to the first end plate 26, the channel 20 is formed as a tubular socket. In a wall 32 of this region 30 of the channel 20, a multitude of through openings 34 is formed, the function of which will be explained in more detail below.

Several claws 38 protrude from the upper or second end plate 28 substantially perpendicularly in an axial direction 36 of the filter cartridge 12. The claws 38 are in engagement with corresponding claws 40, which are provided on the cover 18 of the oil filter housing 14. The filter cartridge 12 hangs on the cover 18 via this interaction of the claws 38, 40, when the filter cartridge 12 is removed from the base body 16 of the oil filter housing 14 and when an unused, i.e., new filter cartridge 12 is subsequently to be used in the base body 16 of the oil filter housing 14. The axial direction 36 thus also corresponds to the direction in which the filter cartridge 12 is pushed into or inserted into the substantially tubular base body 16 of the oil filter housing 14 when installing the filter cartridge 12.

Figure 2:
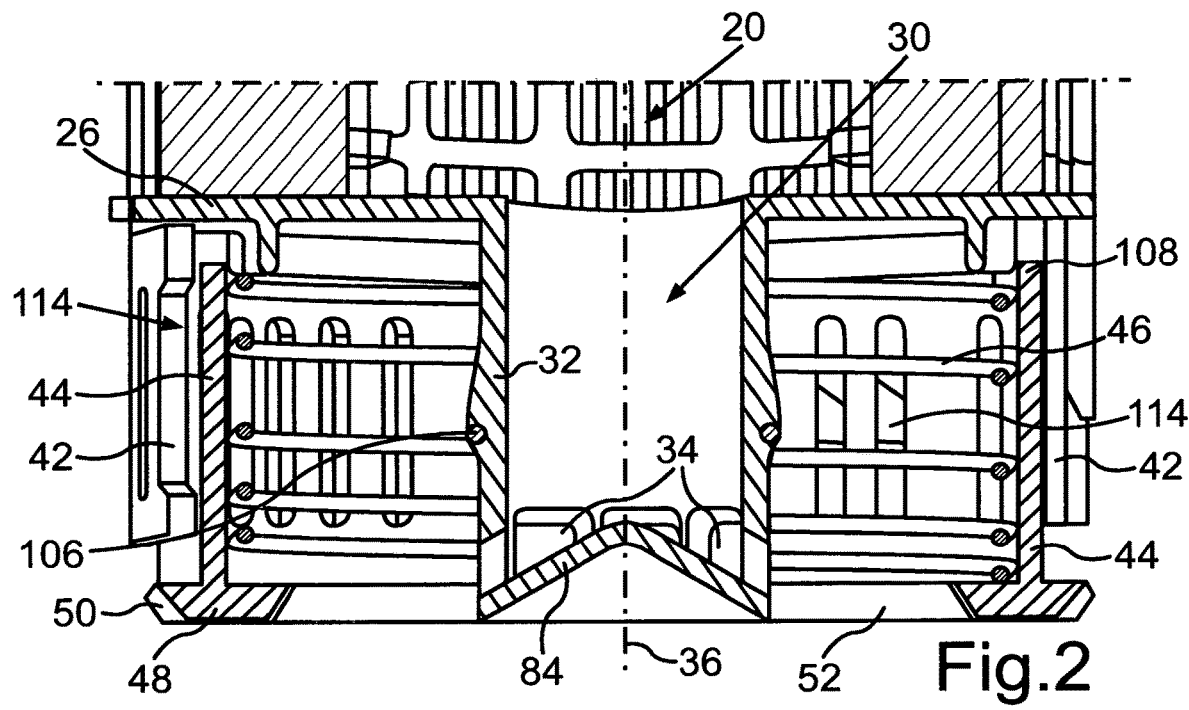
FIG. 2 illustrates an end region of the filter cartridge in an enlarged detailed view.

Looking at FIG. 1 and FIG. 2 together, further details of the filter cartridge 12 in terms of the service position or dismantling position of the filter cartridge 12 shown in FIG. 1 shall be explained. A sleeve-shaped wall 42 protrudes in the axial direction 36, i.e., substantially perpendicularly to the end plate 26, from the lower or first end plate 26 of the filter cartridge 12. A sleeve element 44 serving as a closing element is shiftably guided along this wall 42 in the axial direction 36. The sleeve element 44 is pressed away from the end plate 26 by means of a spring 46. Sealing elements in the form of an outer sealing ring 50 and an inner sealing ring 52 are arranged on an axial end 48 of the sleeve element 44. In the region of the sealing rings 50, 52, the end 48 is formed to run conically or stamp-shaped. An outlet channel 54 for oil to be removed from the oil filter housing 14 is closed by means of these sealing rings 50, 52 when the cover 18 of the oil filter housing 14 is closed (cf. FIG. 4).

In contrast, in the service position or dismantling position of the filter cartridge shown in FIG. 1, the sleeve element 44 serving as the closing element is spaced apart from a corresponding inlet 56 of the outlet channel 54 by the sealing rings 50, 52 provided on the end 48 of the sleeve element 44. The annular inlet 56 of the outlet channel 54 is presently formed to be funnel-shaped and thus formed to receive the stamp-shaped end 48 of the sleeve element 44. In the service position of the filter cartridge 12 shown in FIG. 1, the outlet channel 54 is thus released. Correspondingly, oil can run out of the region of the oil filter housing 14 in which the filter cartridge 12 can be found. Removing this unfiltered oil from the oil filter housing 14 is illustrated by corresponding arrows 58 in FIG. 1.

Figure 3:
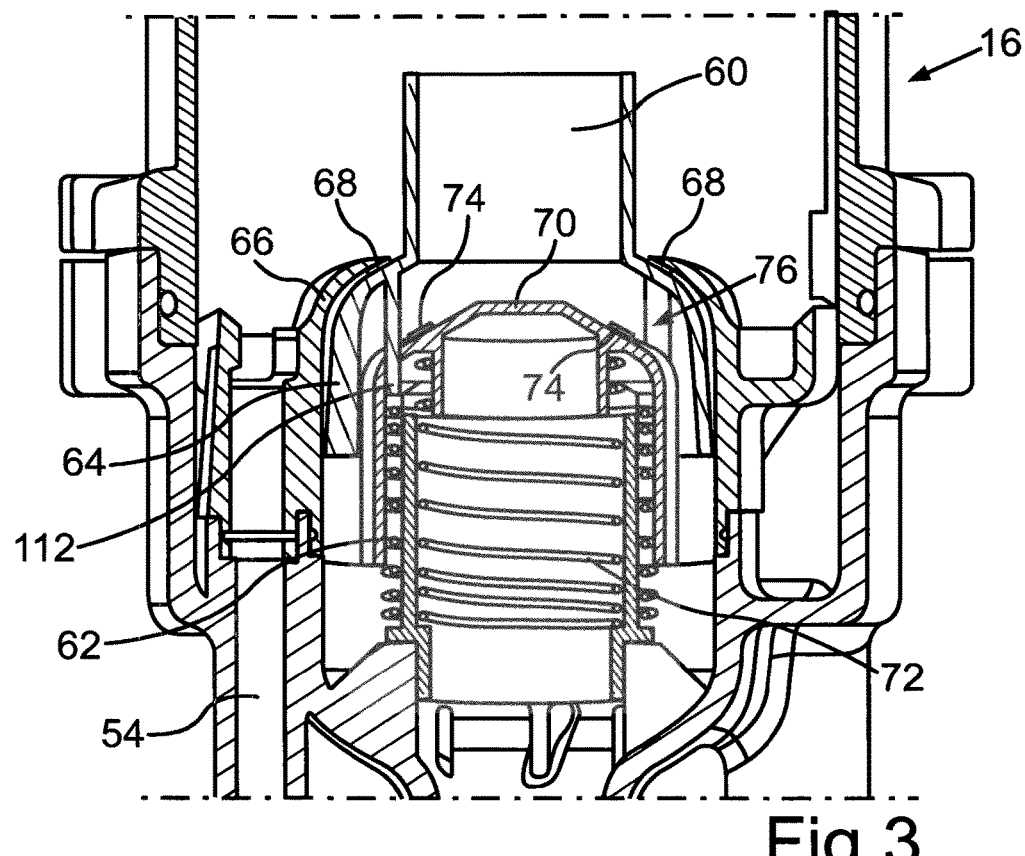
FIG. 3 illustrates components of the oil filter provided on sides of the oil filter housing in a detailed view.

Further components of the oil filter 10 provided on sides of the base body 16 of the oil filter housing 14 shall be illustrated by FIG. 3. Thus, a tubular receiver 60 is provided on sides of the base body 16, in which receiver 60 the region 30 of the channel 20 of the filter cartridge 12 is received when the filter cartridge 12 is arranged in the oil filter housing 14 and the cover 18 of the oil filter housing 14 is closed (cf. FIG. 4). The tubular receiver 60 is supported in an axial direction by a spring element in the form of a by-pass valve spring 62. This by-pass valve spring 62 presses a presently funnel-shaped region 64 of the receiver 60 against a wall 66 of the base body 16 of the oil filter housing 14, which is presently also funnel-shaped. A seal 68 is provided between this region 64 of the receiver 60 and the wall 66 (cf. FIG. 15).

The seal 68 can be arranged on the receiver 60 and/or on the wall 66. Presently, the wall 66 and the region 64 are formed to be funnel-shaped or conical where the seal 68 can be found. Correspondingly, the seal 68 is presently also arranged to be bevelled in relation to the axial direction 36. However, in variants of the oil filter 10, at least one seal arranged to be planar or level can also be provided instead with a corresponding formation of the receiver 60 and the wall 66.

Furthermore, a hood-shaped or dome-like closing device 70 is arranged inside the tubular receiver 60. This closing device 70 is supplied with a spring force in the axial direction 36 by a further spring element in the form of a check valve spring 72. The check valve spring 72 presses the closing device 70 against the tubular receiver 60 (cf. FIG. 1).

In FIG. 3, the closing device 70 is shown spaced apart from a contact surface formed on the tubular receiver 60. Correspondingly, a seal 74 (presently arranged on the closing device 70) can be seen. Furthermore, in this state, a channel 76 provided on sides of the oil filter housing 14 can be flowed through by the filtered oil, which can emerge from the channel 20 of the filter cartridge 12 via the though openings 34. In the position of the closing device 70 shown in FIG. 3 in which the closing device 70 is moved away from the receiver 60 against the force of the check valve spring 72, an inlet into the channel 76 for the filtered oil provided on sides of the oil filter housing 14 is correspondingly released. Correspondingly, there is a fluid connection between the through openings 34 and the inlet into the channel 76.

The valve functions that can be implemented by means of the filter cartridge 12 will be explained more accurately below. A service valve 78 is presently provided with the inlet 56 of the outlet channel 54 by means of the interaction of the sleeve element 44 with the axial seal in the form of the sealing rings 50, 52. In the service position of the filter cartridge 12 shown in FIG. 1, in which the axial end 48 of the sleeve element 44 is moved away from the inlet 56 of the outlet channel 54, the service valve 78 is correspondingly open.

As a result of the interaction of the filter cartridge 12 with the tubular receiver 60 and the closing device 70, a check valve 80 and a by-pass valve 82 are further provided (cf. FIG. 1). In the service position shown in FIG. 1, the check valve 80 and the by-pass valve 82 are closed. The check valve 80 is closed when the seal 74 arranged on the closing device 70 abuts on the receiver 60. The by-pass valve 82 is closed when the seal 68 presently arranged on the receiver 60 abuts on the wall 66. The wall 66 thus serves practically as a valve bearer for the by-pass valve 82.

Figure 4:
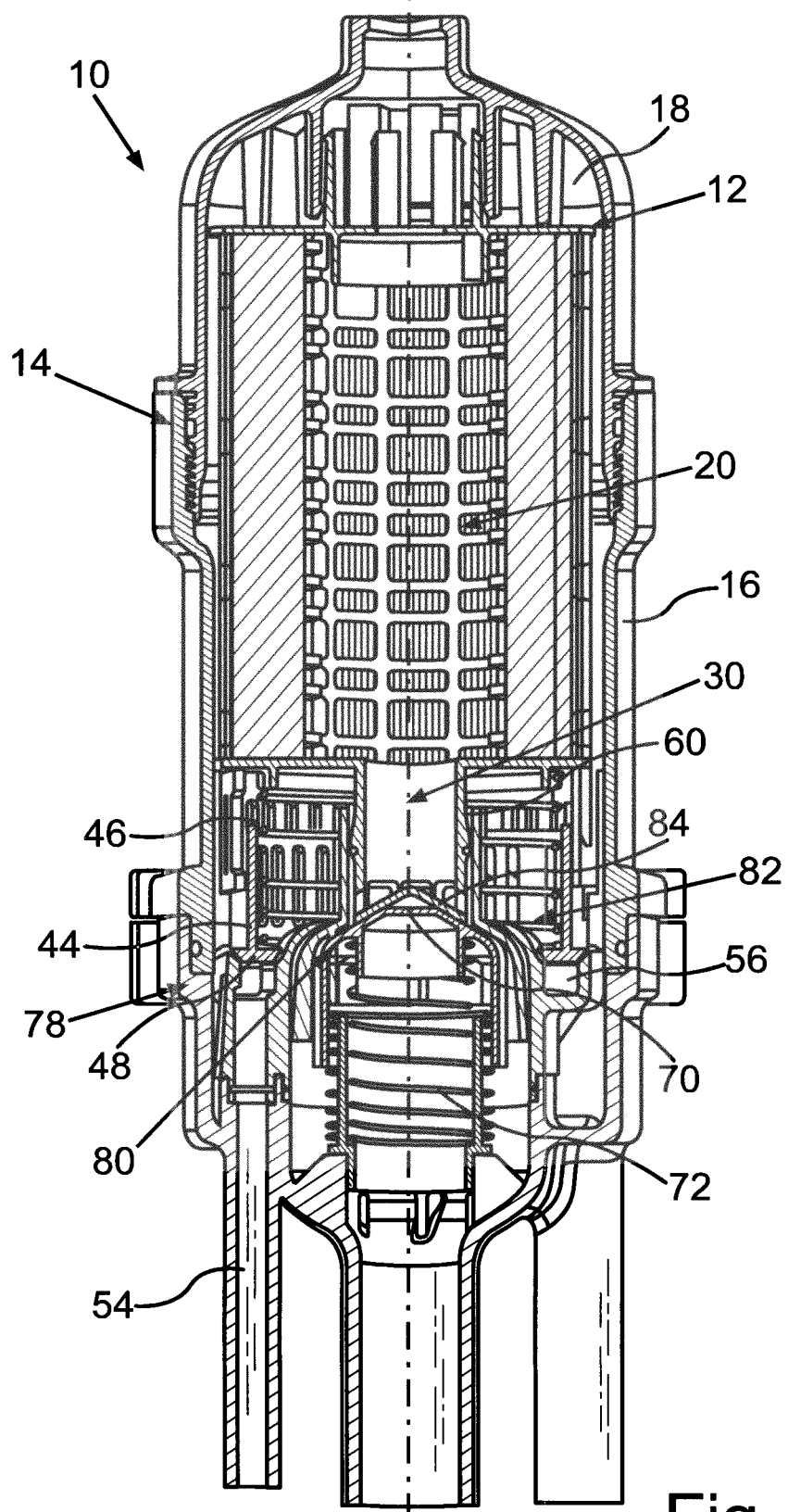
FIG. 4 illustrates the oil filter according to FIG. 1 when the oil filter housing is closed and the internal combustion engine is switched off.

FIG. 4 shows the oil filter 10 according to FIG. 1 in the sectional view, wherein the oil filter housing 14 is closed, i.e., the cover 18 is mounted on the base body 16. In the situation shown in FIG. 4, the internal combustion engine of the motor vehicle, which has the oil filter 10, is not in operation. Correspondingly, the oil pump is also not running, which moves the unfiltered oil to the filter cartridge 12 when the internal combustion engine is running. As a result of the cover 18 being mounted fitting tightly on the base body 16, the spring 46 presses the stamp-shaped end 48 of the sleeve element 44 against the inlet 56 of the outlet channel 54. Correspondingly, the service valve 78 is closed.

With the variants of the filter cartridge 12 shown in FIG. 1 and FIG. 4, the region 30 of the channel 20 is formed to be closed on the end side, i.e., on its end facing towards the closing device 70. Correspondingly, a base part 84 (presently formed conically) of the channel 20 abuts on the closing device 70 (presently formed running conically) (cf. FIG. 15).

In the installation position of the filter cartridge 12 shown in FIG. 4, the static pressure of the filter cartridge 12 and of the oil above the base part 84 thus bears down on the closing device 70. However, the check valve spring 72 is designed in such a way that its spring force is greater than this static pressure. Correspondingly, the check valve 80 is also closed in the first position of the filter cartridge 12 shown in FIG. 4. Furthermore, the by-pass valve 82 is also closed.

Figure 5:
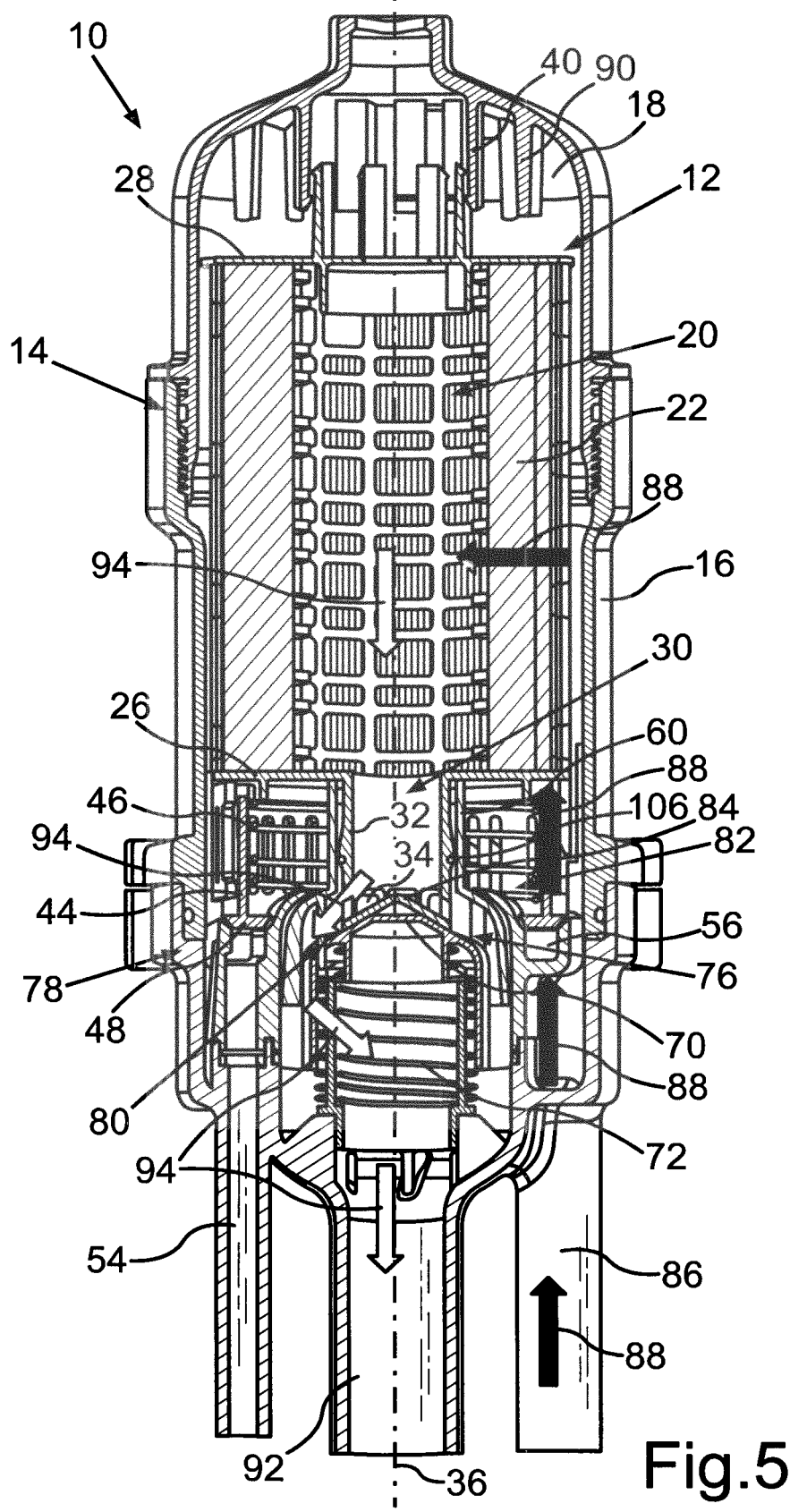
FIG. 5 illustrates the oil filter according to FIG. 1 when the oil filter housing is closed when the internal combustion engine is running.

FIG. 5 illustrates the situation when the internal combustion engine is running. The contaminated, unfiltered oil reaches the region of the oil filter 10, in which the filter cartridge 12 can be found, via a supply channel 86. The corresponding path of the oil to the filter cartridge 12 and further in the radial direction through the filter material 22 of the filter cartridge 12 into the inner, central channel 20 of the filter cartridge 12 is illustrated by corresponding arrows 88 in FIG. 5.

The unfiltered oil introduced by the oil pump of the motor vehicle into the supply channel 76 exerts a certain pressure on the filter cartridge 12. Here, the pressure acting on the second end plate 28 in relation to the pressure acting on the (smaller) lower end plate 26 and the loss of pressure of the oil when passing through the filter material 22 is important for the axial shifting of the filter cartridge 12 into a second position shown in FIG. 5. Furthermore, the spring forces applied by the check valve spring 72 and the spring 46 play a role. As a result, the spring 46, which presses the end 48 of the sleeve element 44 against the inlet 56 of the outlet channel 54, is pressed further together in the second position of the filter cartridge 12 shown in FIG. 5 than in the first position of the filter cartridge 12 shown in FIG. 4. The upper end plate 28 of the filter cartridge 12 correspondingly no longer abuts on spacers 90 which are formed in the region of the claws 40 on the cover 18 of the oil filter housing 14.

Furthermore, the lower end plate 26 abuts on an upper, axial end of the tubular receiver 60. However, in the first position shown in FIG. 4, the lower end plate 26 is spaced apart from the upper end of the receiver 60. Correspondingly, the socket-shaped region 30 of the channel 20, whose base part 84 abuts on the closing device 70, is further inserted into the tubular receiver 60 when the filter cartridge 12 is shifted in the axial direction 36 from the first position (cf. FIG. 4) into the second position (cf. FIG. 5). Here, the region 30 of the filter cartridge 12 presses the closing device 70 against the force of the check spring 72 away from the receiver 60. Correspondingly, the channel 76 can be flowed through by oil. The check valve 80 is thus opened. In comparison, the by-pass valve 82 remains closed. The flow path of the filtered oil through the channel 20, via the through openings 34 into the inlet of the channel 76 and further though a channel 92 formed in the base body 16 of the oil filter housing 14 is illustrated by further arrows 94 in FIG. 5.

Figure 6:
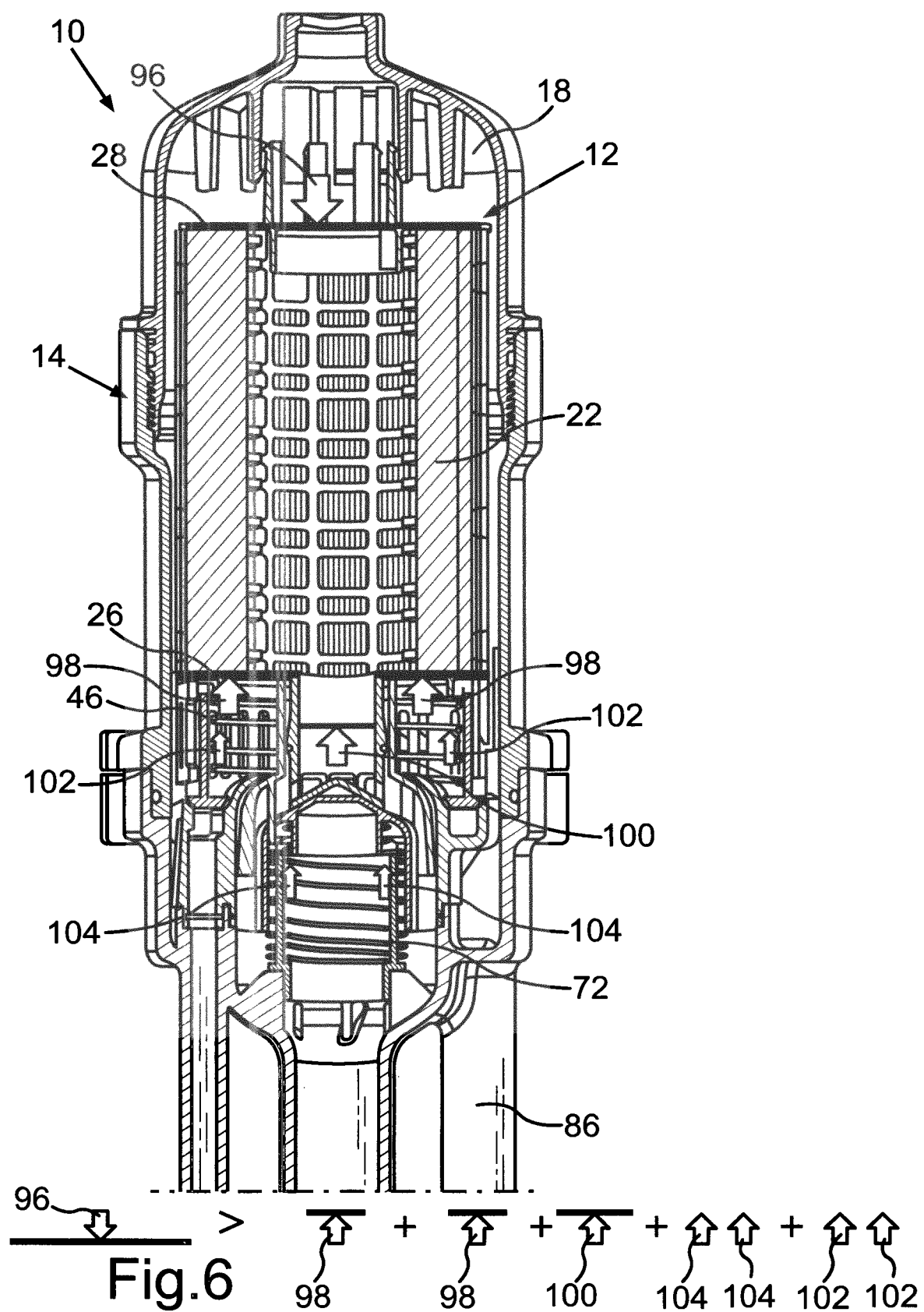
FIG. 6 illustrates schematically, the forces which act when shifting the filter cartridge according to FIG. 5.

In FIG. 6, arrows illustrate the pressures, which lead to the axial shifting of the swimmingly mounted filter cartridge 12 inside the oil filter housing 14 when the oil pump moves the unfiltered oil into the oil filter housing 14. Thus, first arrows 96 illustrate the pressure of the unfiltered oil on the upper end plate 28 of the filter cartridge 12. Further arrows 98 illustrate the pressure of the unfiltered oil on the lower end plate 26 of the filter cartridge 12. A third arrow 100 illustrates the pressure of the oil downstream of the filter material 22, which is correspondingly reduced in comparison to the pressure of the unfiltered oil because of the loss of pressure. Furthermore, arrows 102 illustrate the spring force applied by the spring 46 and arrows 104 illustrate the spring force applied by the check valve spring 72. Correspondingly, the force illustrated by the arrow 96 is greater than the sum of the forces illustrated by the arrows 98, 100, 102, 104. These force ratios cause the axial shifting of the filter cartridge 12 when the internal combustion engine is running.

A sealing element, which is presently formed as an O-ring 106, for example, is arranged on an outside of the wall 32 in the region 30 of the channel 20 (cf. FIG. 2). This radial seal abuts on the inside of the tubular receiver 60, in which the region 30 is received. This O-ring 106 or sealing ring is thus axially shifted together with the filter cartridge 12, when the filter cartridge 12 is moved from the first position (cf. FIG. 4) into the second position (cf. FIG. 5). The sealing ring or O-ring 106 that is arranged on the filter cartridge 12 or integrated into the filter cartridge 12 and that can be axially shifted together with the filter cartridge 12 enables an axial stroke of the filter cartridge 12, wherein it is ensured by this sealing element that only the filtered oil from the channel 20 and not any unfiltered oil reaches channel 76 in the position of the filter cartridge 12 shown in FIG. 5.

A hydraulic attenuator region is provided by the oil which is found in the region of the check valve spring 72. As a result, pressure variations of the oil do not lead to an axial swinging with low amplitude, i.e., to a rapidly alternating movement of the filter cartridge 12 backwards and forwards inside the oil filter housing 14 in the axial direction 36. In order to improve this hydraulic attenuation behavior, restrictor bores or similar openings that can be flowed through can be provided, for example in the region of a wall on which the check valve spring 72 abuts.

Figure 7:
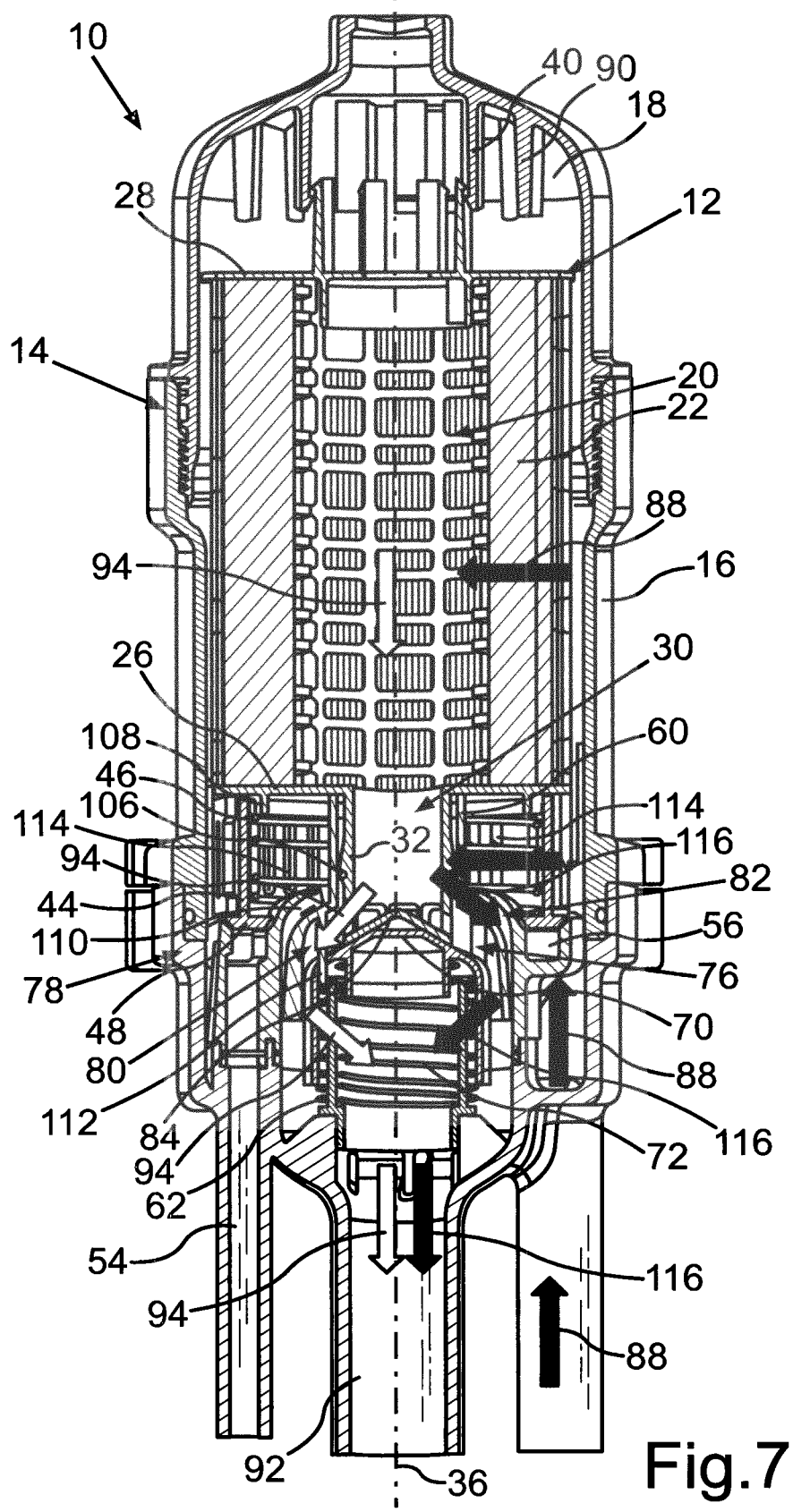
FIG. 7 illustrates the filter cartridge shifted further still in the axial direction with added filter material, wherein a by-pass valve is open.

FIG. 7 shows the oil filter 10 in a further sectional depiction. In the situation shown in FIG. 7, the filter cartridge 12 is shifted even further in the axial direction 36 in relation to the second position (cf. FIG. 5). Correspondingly, a distance of the upper end plate 28 of the filter cartridge 12 from the spacers 90 is here even greater than in the situation shown in FIG. 5. Now, the lower end plate 25 also furthermore abuts on an upper end 108 of the sleeve element 44 according to FIG. 7. This upper end 108 of the sleeve element 44 is opposite the lower end 48, which closes the outlet channel 54. The service valve 78 correspondingly remains closed.

However, the axial shifting of the filter cartridge 12 in the axial direction 36 into the third position shown in FIG. 7 causes the tubular wall 60 to be moved away from the wall 66. Correspondingly, a by-pass channel 110 can now be flowed through, through which unfiltered oil can reach the channel 92. A foot region 112 of the receiver 50 here presses the by-pass valve spring 62 together. The check valve spring 72 is also further pressed together when the filter cartridge 12 is shifted into the third position shown in FIG. 7, as is the case in the second position of the filter cartridge 12 shown in FIG. 5.

The unfiltered oil can reach a receiving space formed presently as a circular space, which is formed between the region 30 or the receiver 50 and the sleeve element 44, via through openings presently formed as slots 114, which are formed both in the sleeve-shaped wall 42 and in the sleeve element 44 (c.f. FIG. 2). The unfiltered oil can reach the by-pass channel 110 from the receiving space and, from this, further into the channel 92. This path of the unfiltered oil is illustrated by corresponding arrows 116 in FIG. 7. As a result of the formation of the size of the through openings presently formed as slots 114, for example, in the sleeve element 44 and the wall 42, a pre-filter sieve can be provided in the variant of the oil filter 10 shown in FIG. 1 to FIG. 8 in case the by-pass valve 82 or the pressure relief valve open in the event of positive pressure.

Figure 8:
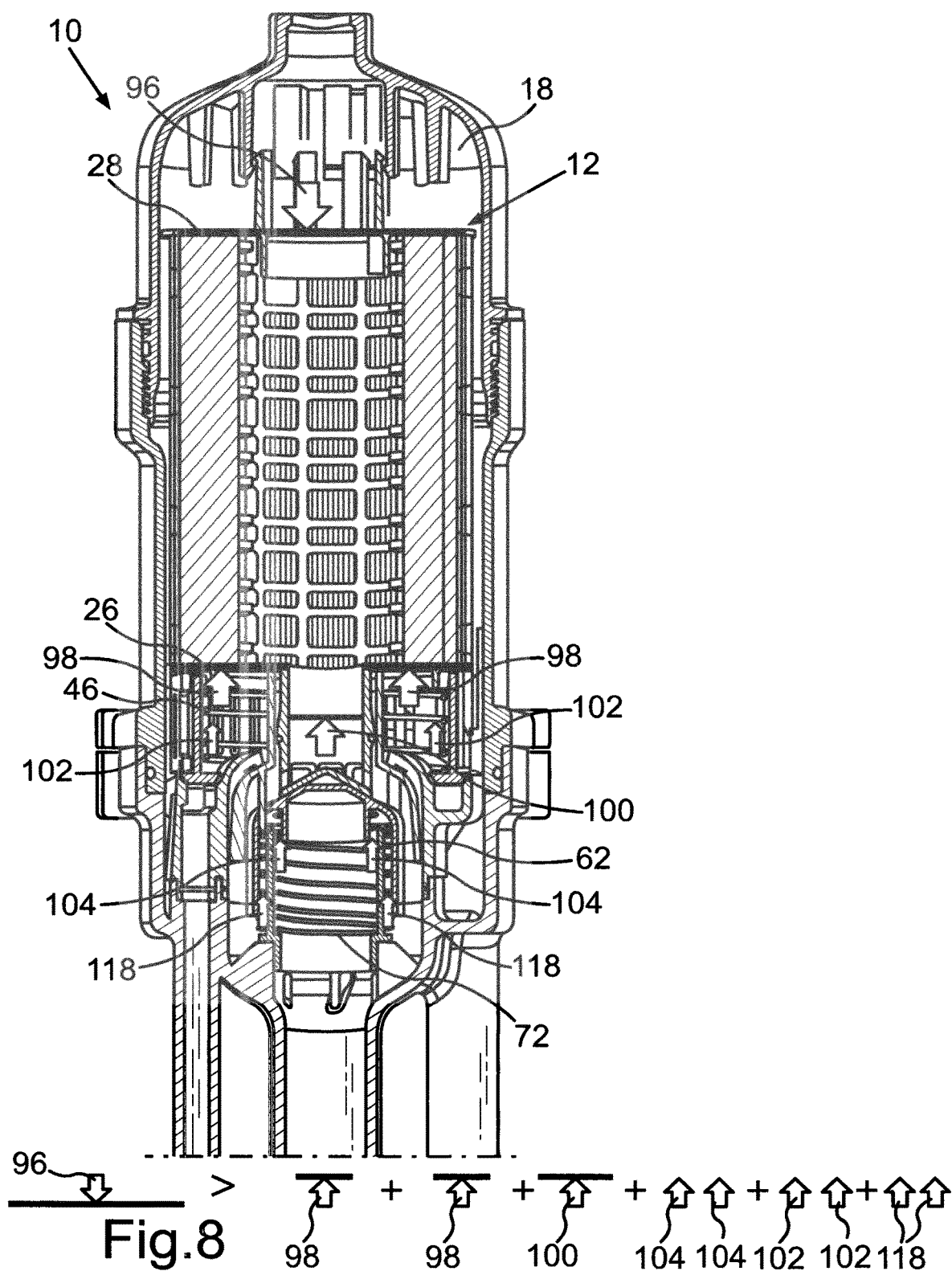
FIG. 8 illustrates the forces acting when opening the by-pass valve according to FIG. 7.

Furthermore, the arrows 88, 94 illustrate the additionally further possible path of the oil in channel 92 through the filter material 22 and subsequently along the channel 20 of the filter cartridge 12. The situation shown in FIG. 7 is the result when the filter material 22 is blocked or added. Then, specifically the pressure exerted by the unfiltered oil on the upper end plate 28 is still present. However, the loss of pressure when the oil passes through the filter material 22 is greater still. Correspondingly then, the pressure of the oil illustrated by the arrow 100 in FIG. 6 and FIG. 8 is lower. This leads to the pressure acting on the upper end plate 28 (cf. arrow 96 in FIG. 8) also being able to overcome the spring force applied by the by-pass valve spring 62.

The corresponding threes are schematically depicted in FIG. 8. Thus, the arrows 98 further illustrate the pressure of the unfiltered oil acting on the lower end plate 26 and the arrows 104 illustrate the spring force applied by the check valve spring 72. In addition, however, further arrows 118 in FIG. 8 illustrate the spring force applied by the by-pass valve spring 62. Correspondingly, the force illustrated by the arrow 96 is greater than the sum of the threes illustrated by the arrows 98, 100, 104, 102, 118. As a result, the by-pass channel 110 is also open in the situation shown in FIG. 7.

The forces of the check valve spring 72 or the by-pass valve spring 62 are preferably designed in such a way that the filter cartridge 12 does not swing during operation. In particular, the spring force of the by-pass valve spring 62 is much greater than the spring force of the check valve spring 72. This ensures that the by-pass valve 82 only opens when the situation portrayed with reference to FIG. 7 and FIG. 8 occurs because of the loss of pressure in the added or blocked filter material 22 and, correspondingly, both the check valve 80 and the by-pass valve 82 are opened.

Figure 9:
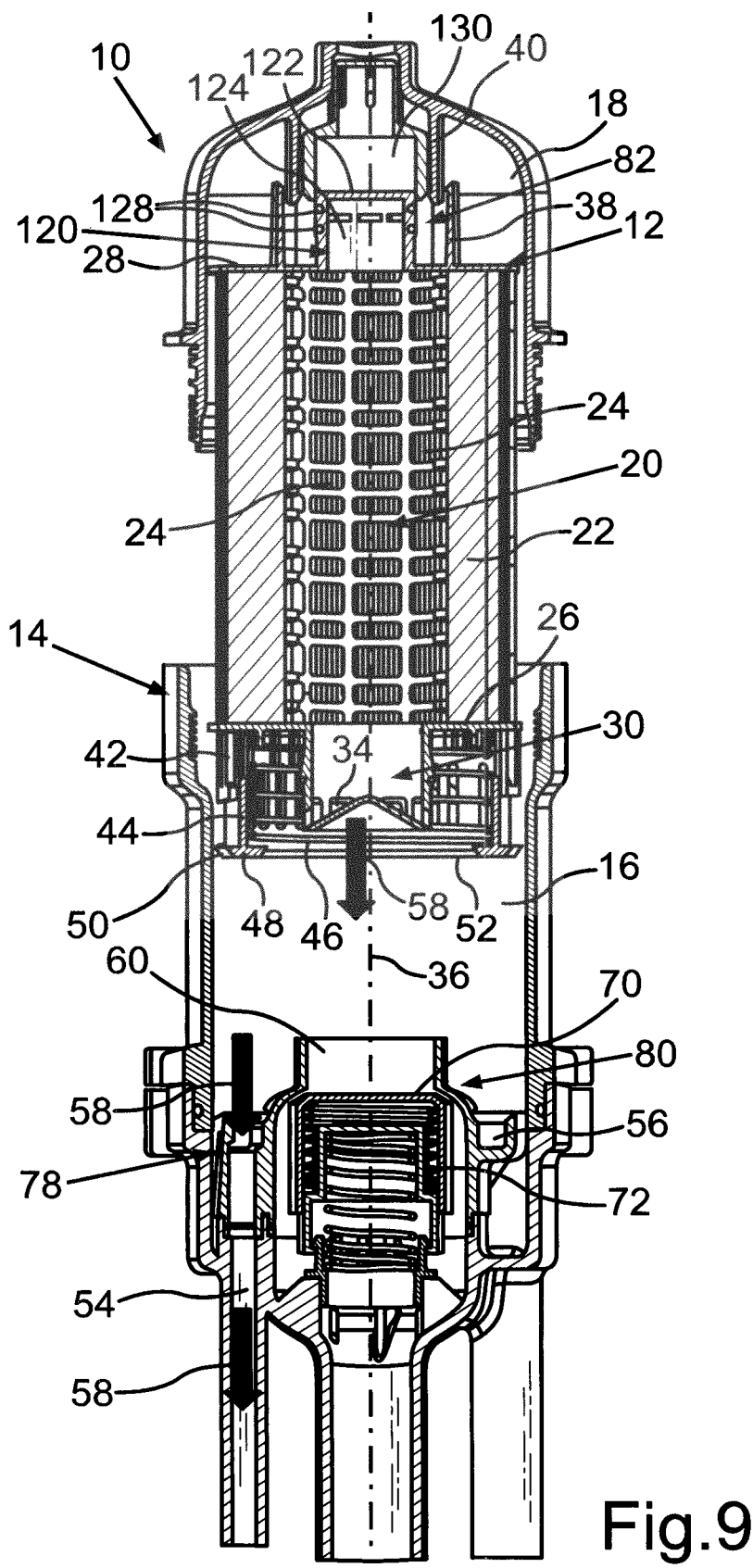
FIG. 9 illustrates in a sectional view, a variant of the oil filter when the oil filter housing is open having a filter cartridge in a service position, wherein a variant of the filter cartridge is installed in the oil filter housing.

FIG. 9 shows a variant of the oil filter 10 in which the filter cartridge 12 and the oil filter housing 14 are constructed somewhat differently from the filter cartridge 12 shown in FIG. 1 and the oil filter housing 14 shown in FIG. 1. In FIG. 9, the filter cartridge 12 is shown in the dismantling position, wherein the covering element or the cover 18 is removed from the base body 16 of the oil filter housing 14. Correspondingly, the filter cartridge 12 is held on the claws 40 provided on sides of the cover 18 via the claws 38. In a lower region in FIG. 9, the filter cartridge 12 is formed analogously to the filter cartridge shown in FIG. 1. Correspondingly, the through openings 34 are provided in the region 30 of the channel 20 which is formed as a tubular socket, presently closed on the ends. The sleeve element 44, the wall 42 and the spring 46 are also formed in the same way as in the variant of the oil filter 10 described above, such that reference is made to the corresponding description in terms of this.

Figure 10:
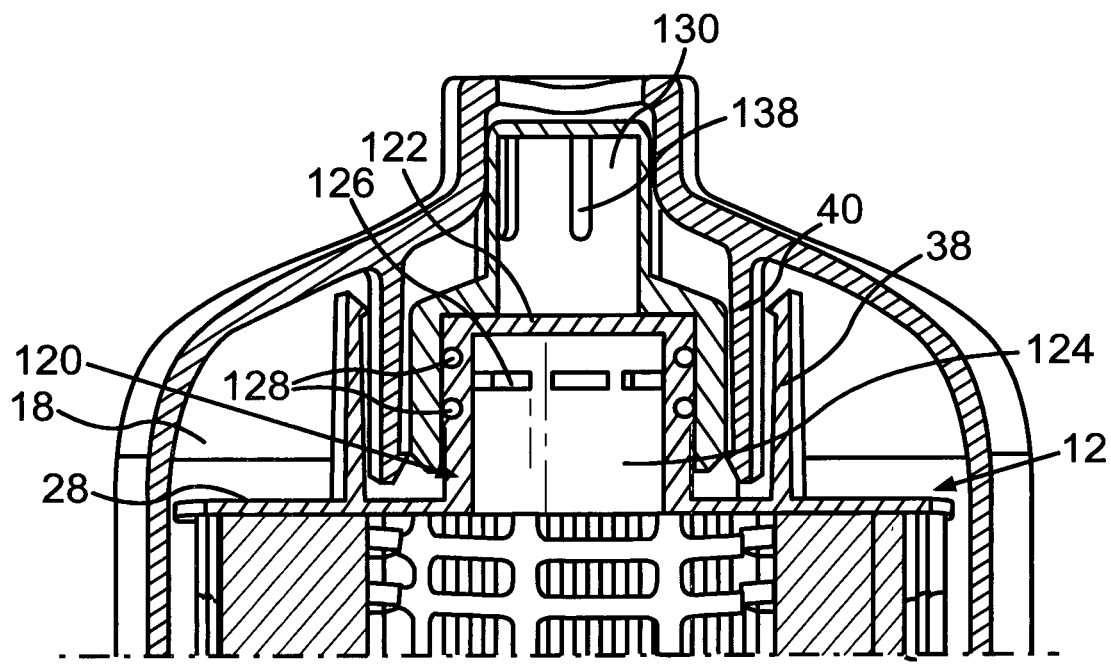
FIG. 10 illustrates a cut-out of the filter cartridge according to FIG. 9 in an enlarged detailed view.

However, the upper end plate 28 is not formed to be closed in the variant of the oil filter 10 or the filter cartridge 12 shown in FIG. 9. Instead, a second region 120 of the channel 20 borders the upper end plate 28, which is closed on the end side by a covering part 122 of the channel 20. In the variant, the by-pass valve 82 is provided in this region 120. For this, through openings 126 are formed in a tubular wall 124 in the region 120 (cf. FIG. 10). The region 120 is thus formed as a tubular socket closed on the end side in this variant, wherein sealing elements, for example in the shape of sealing rings 128, are arranged on the outside of the socket on both sides of the through openings 126 (cf. FIG. 10).

In the dismantling position of the filter cartridge 12 shown in FIG. 9, the region 120 of the channel 20 is moved almost completely out of a beaker-shaped or tubular receiver 130, which is provided on sides of the cover 18. Presently, the receiver 130 is formed as an insert arranged on a base body of the cover 18. The receiver 130 can, however, also be formed to be one piece with the cover 18. In the position of the filter cartridge 12 shown in FIG. 9, the through openings 126 formed in the region 120 in the wall 124 are accessible, such that the by-pass valve is open. This is because the cover 18 is not yet connected to the base body 16 of the oil filter housing 14. Furthermore, the service valve 78 is open and the check valve 80 is closed. The service valve 78 is formed by the sleeve element 44 interacting with the inlet 56 of the outlet channel 54 and serving as the closing element. In terms of this, reference is made to the description relating to the variants of the oil filter 10 shown in FIG. 1 to FIG. 8.

In contrast, the check valve 80 is formed differently to the variant of the oil filter 10 shown in FIG. 1 to FIG. 8. In the variant of the oil filter 10 shown in FIG. 9, specifically the tubular receiver 60 is formed to be fixed and thus also is not moveable in the axial direction 36. The closing device 70 is also not formed to run conically, but rather to be substantially planar on its upper side facing towards the filter cartridge 12. The closing device 70 is only beveled in the region in which the seal 74 is arranged on the closing device 70, i.e., in an edge region or corner region of the closing device 70. Here, the bevel corresponds to the bevel of a funnel-shaped region 132 of the receiver 60 (cf. FIG. 13). However, the receiver 60 also serves as a valve carrier in this variant.

Figure 11:
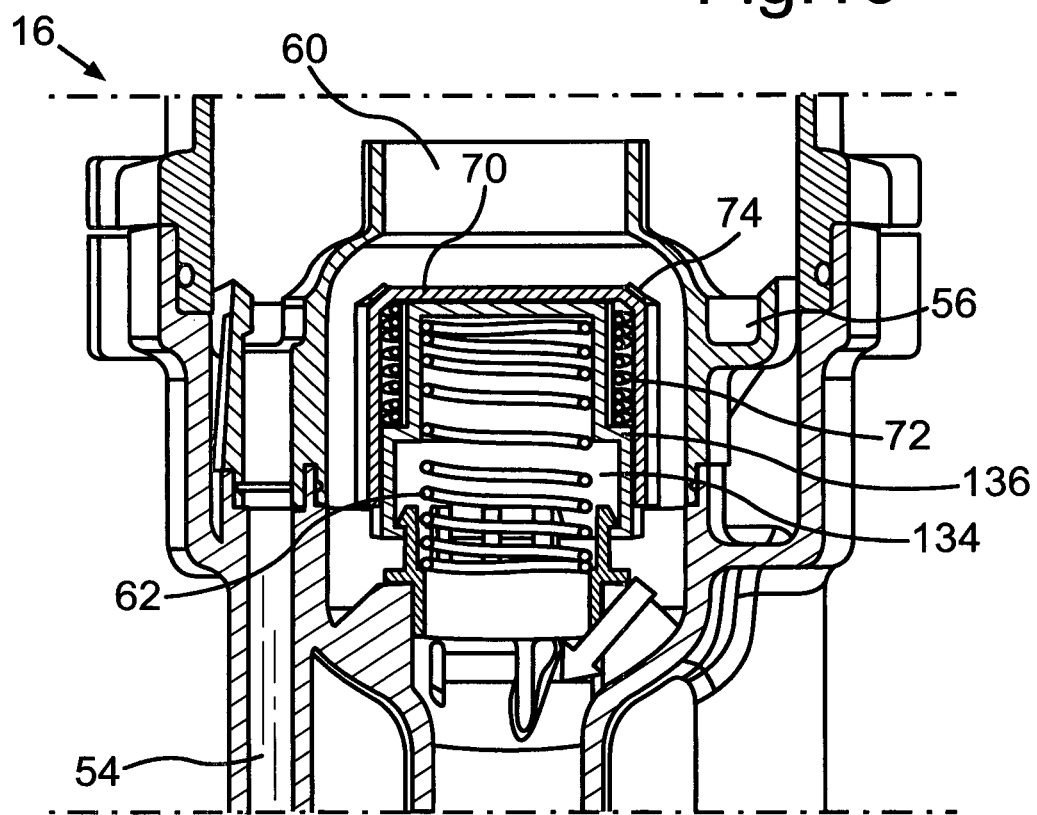
FIG. 11 illustrates components of the oil filter housing according to FIG. 9 in an enlarged detailed view.

In the variant of the oil filter 10 shown in FIG. 9, the check valve spring 72, however, surrounds a cylinder 134 in which, in turn, the by-pass valve spring 62 is arranged. The check valve spring 72 is correspondingly supported on a support 136 of the cylinder 134. The closing device 70 of the cheek valve 80 is shown moved into its open position in FIG. 11. Correspondingly, the frontal end, i.e., the presently planar upper side of the closing device 70, abuts on an upper frontal side of the cylinder 134. Correspondingly, the seal 74 is moved away from the region 132 of the receiver 60.

In contrast, in the closed position of the check valve 80 shown in FIG. 9, the check valve spring 72 presses the closing device 70 with its seal 74 (cf. FIG. 11) in a tightly fitting manner in the region 132 against the receiver 60.

Figure 12:
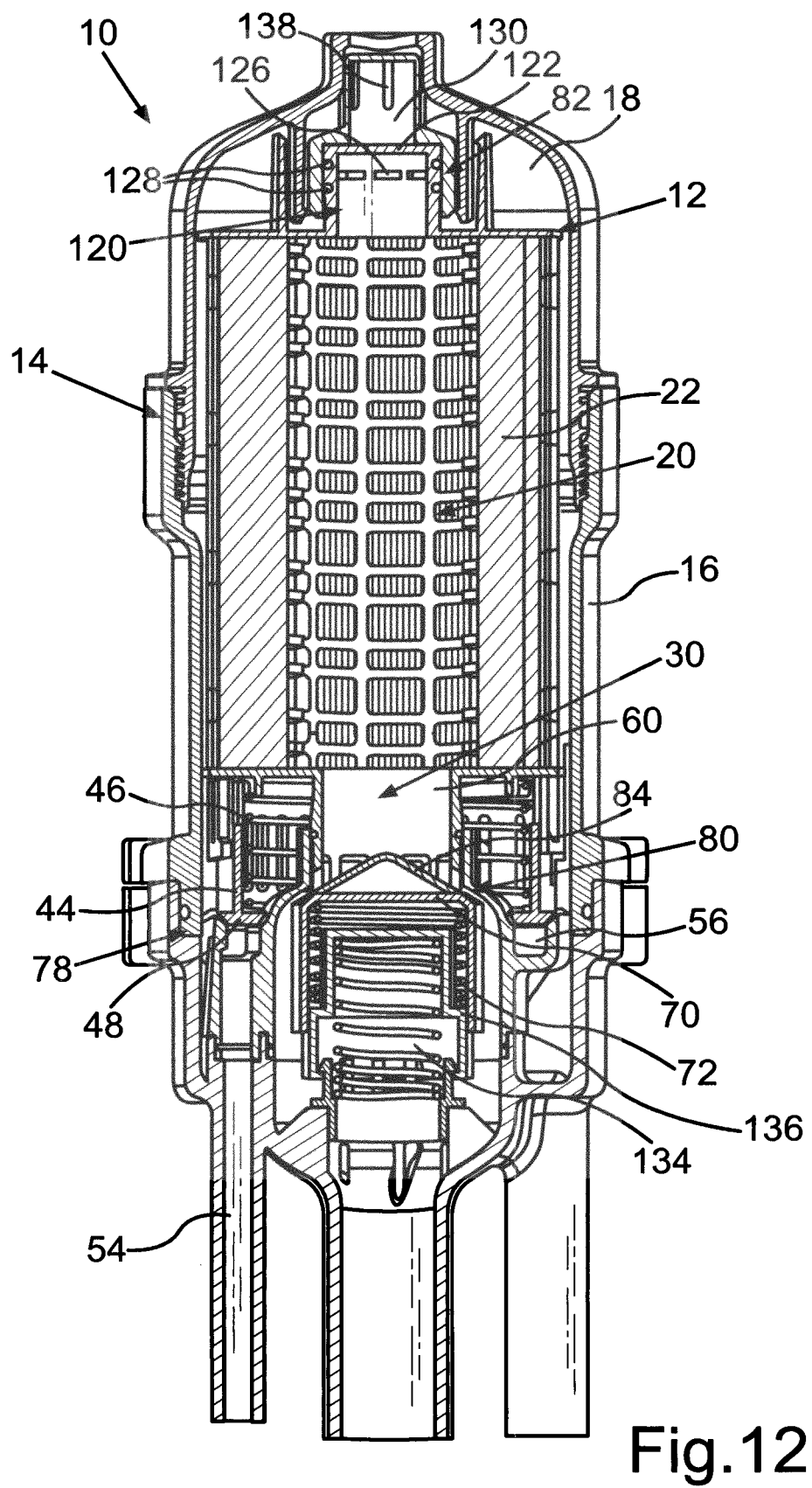
FIG. 12 illustrates the oil filter according to FIG. 9 with closed oil filter housing and filter cartridge installed in the oil filter housing when the internal combustion engine is not running.

FIG. 12 shows the oil filter 10 according to FIG. 9 when the oil filter housing 14 is closed. Correspondingly, the cover 18 is mounted on the base body 16 of the oil filter housing 14. The spring 46 presses the end 48 of the sleeve element 44 against the inlet 56. Correspondingly, the outlet channel 54 cannot be flowed through, and the service valve 78 is closed. The filter cartridge 12 is in the first position, since the internal combustion engine of the motor vehicle is not yet in operation, and correspondingly, the oil pump still does not move any oil to the filter cartridge 12. Correspondingly, the closing device 70 is also moved away from the cylinder 134 by means of the check valve spring 72. Correspondingly, the check valve 80 is closed.

The socket-shaped region 120 of the channel 20 is introduced into the receiver 130, which is provided on sides of the cover 18. The sealing rings 128 correspondingly abut on an inside of the tubular receiver 130. Correspondingly, no unfiltered oil can enter into the through openings 126. As a result, the by-pass valve 82 is also closed.

However, unfiltered oil can reach the receiving space delimited by the cover part 122 inside the receiver 130 via inflow openings 138, which are provided in the receiver 130. As a result, a hydraulic attenuation region is provided. The inflow openings 138 here act as restrictor elements. In the event of any pressure variations in the oil filter housing 14, these attenuate a swinging or rapid movement forwards and backwards of the filter cartridge 12 in the axial direction 36. As a result of an axial swinging of the filter cartridge 12 being prevented, an abrasion of the radial seal, i.e., presently of the O-ring 106, is also particularly marginal.

The sealing rings 128 formed as radial seals in the region 120 of the channel 20 prevent the unfiltered oil from entering the channel 20 if the through openings 126 overlap with the wall of the receiver 130.

Figure 13:
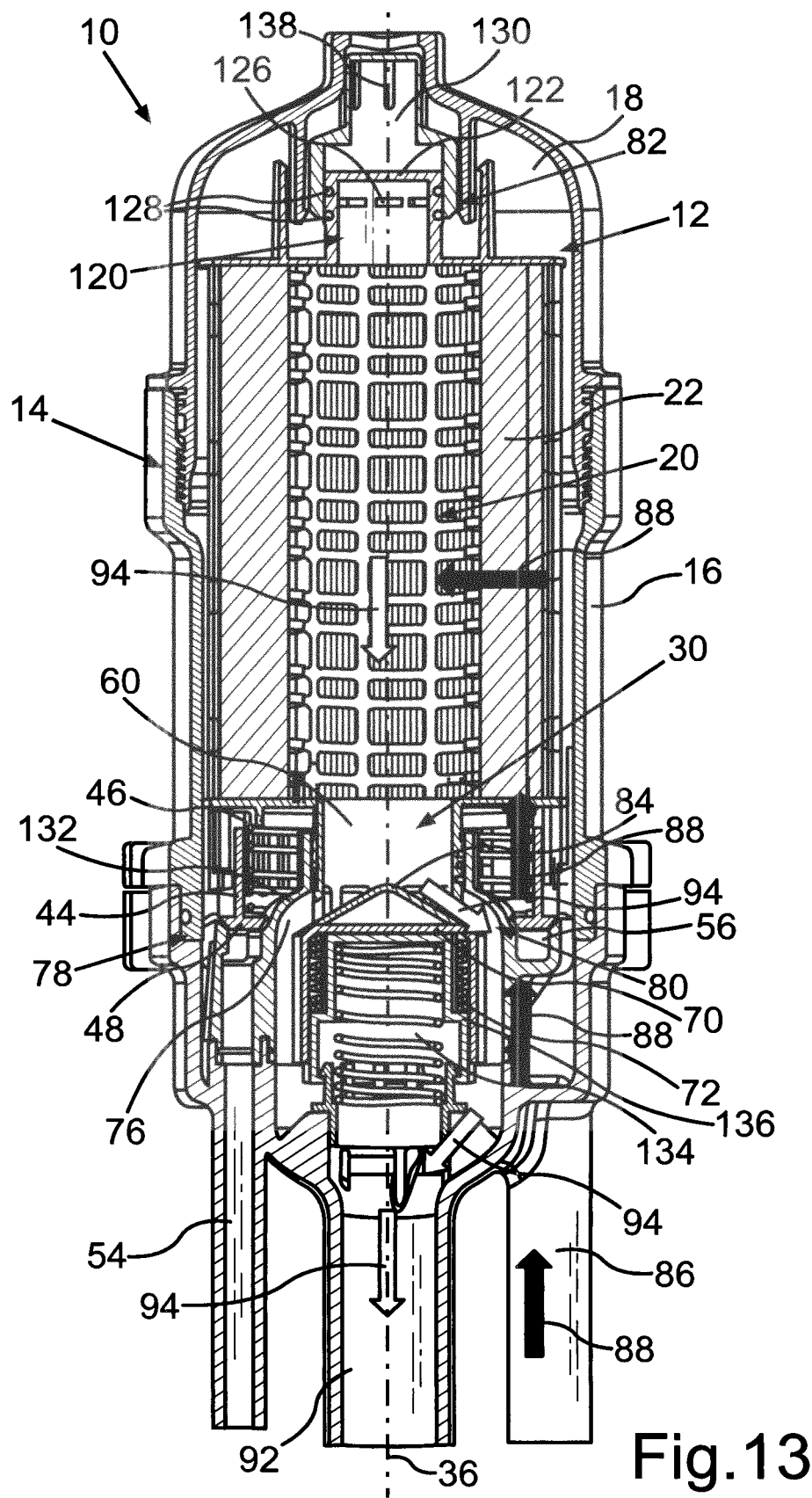
FIG. 13 illustrates the oil filter according to FIG. 9 when the internal combustion engine is running.

FIG. 13 shows the filter cartridge 12, which is shifted in the axial direction 36 from the first position shown in FIG. 12 into a second position. Here, the axial shifting of the swimmingly mounted filter cartridge 12 is also caused by the pressure with which the oil pump moves unfiltered oil into the oil filter 10 when the internal combustion engine is running. The loss of pressure when flowing through the filter material 22 causes the pressure of the unfiltered oil to shift the filter cartridge 12 in the axial direction 36. Here, the region 30 of the channel 20 adjoining the lower end plate 26 correspondingly presses the closing device 70 in the region 132 of the receiver 60 away from the receiver 60. The check valve spring 72 is correspondingly pressed further together than in the first position of the filter cartridge 12 shown in FIG. 12.

Correspondingly, the through openings 34, which are formed in the region 30 of the channel 20 in the wall 32, are fluidically connected to an inlet into the channel 76 provided on sides of the oil filter housing 14. Thus, filtered oil can reach this channel 76, and the check valve 80 is open. The service valve 78 is correspondingly further closed. The by-pass valve 82 is also further closed. In FIG. 13, the arrows 88 illustrate, in turn, the path of the unfiltered oil through the oil filter housing 14 and, subsequently, in a radial direction through the filter material 22 into the channel 20. In an analogous manner, the arrows 94 illustrate the path of the filtered oil through the channel 20 and the through openings 34 into the channel 76 and further towards the internal combustion engine via the channel 92. The lower end plate 26 of the filter cartridge 12, however, still does not abut on the receiver 60.

Figure 14:
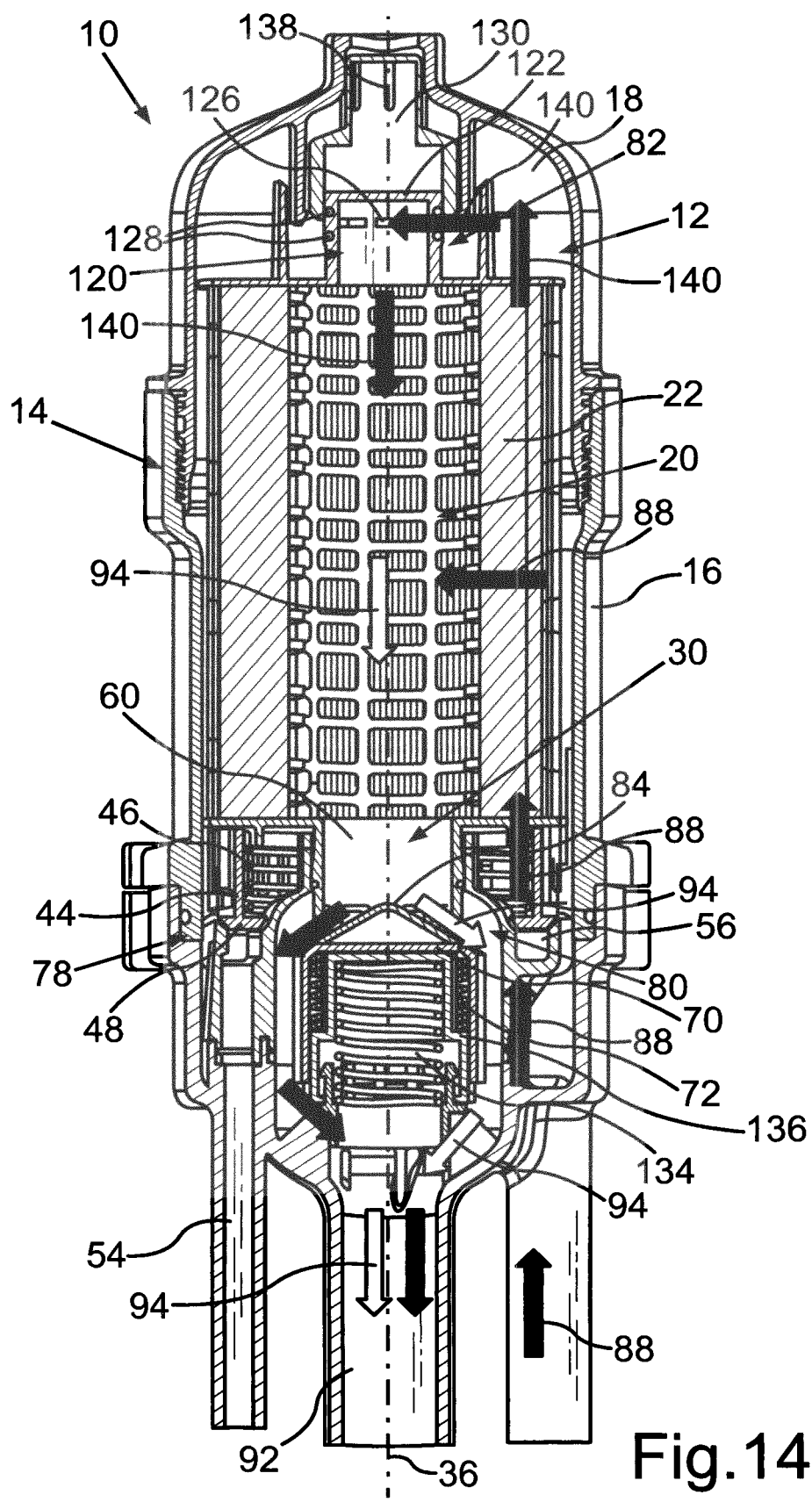
FIG. 14 illustrates the opening of the by-pass valve when the internal combustion engine is running and the filter material is blocked in the variant of the oil filter according to FIG. 9.

In the situation shown in FIG. 14, the filter material 22 is blocked or added. Correspondingly, the loss of pressure of the oil is greater when flowing through the filter material 22. This causes the filter cartridge 12 to be further shifted in the axial direction 36 in terms of the second position of the filter cartridge 12 shown in FIG. 13. Correspondingly, the lower end plate 26 comes into abutment with the receiver 60. Furthermore, the cylinder 134 is also pressed downwards against the force of the by-pass valve spring 62. Correspondingly, in this variant, the channel 76 is also further open. The check valve 80 is thus further open, while the service valve 78 remains closed.

Correspondingly, the by-pass valve 82 is now also open. The region 120 of the channel 20 is moved out of the receiver 130 so far that the unfiltered oil can reach the region 120 of the channel 20 via the through openings 126. The corresponding current path of the unfiltered oil is illustrated in FIG. 14 by further arrows 140. Together with the oil passing through the filter material 22 and thus filtered (arrow 94), the unfiltered oil also further reaches the channel 92 via the channel 76. In this third position of the filter cartridge 12, the lower end plate 26 also abuts on the upper end 108 of the sleeve element 44. Correspondingly, the spring 46 is also pressed together as far as it will go. The check valve spring 72 is also pressed further together than when the filter cartridge 12 is in the second position shown in FIG. 13.

Both in the variant of the oil filter 10 shown in FIG. 1 to 8 and in the variant of the oil filter 10 explained with reference to FIG. 9 to FIG. 14, the service valve 78 or discharge valve, the check valve 80 and the by-pass valve 82 or the pressure relief valve are controlled by the movement of the filter cartridge 12.

In the variants presently shown, the spring 46 serving to close the service valve 78 is a component of the filter cartridge 12. However, it is also possible to provide such a spring element on sides of the oil filter housing 14. Furthermore, the swimming mounting of the filter cartridge 12 is presently described for a utility vehicle with reference to the oil filter 10. However, the opening of at least the check valve 80 and the by-pass valve 82 used by the axial shifting of the filter cartridge 12 can also be used with an oil filter, as it is used in a passenger motor vehicle. Here, only the function of the service valve 78 is not required. This is because, with an oil filter for a passenger motor vehicle, the filter cartridge 12 is usually mounted into the oil filter housing from below or removed downwardly from the oil filter housing, such that the oil to be discharged can run out through the corresponding opening below unhindered.

Figure 15:
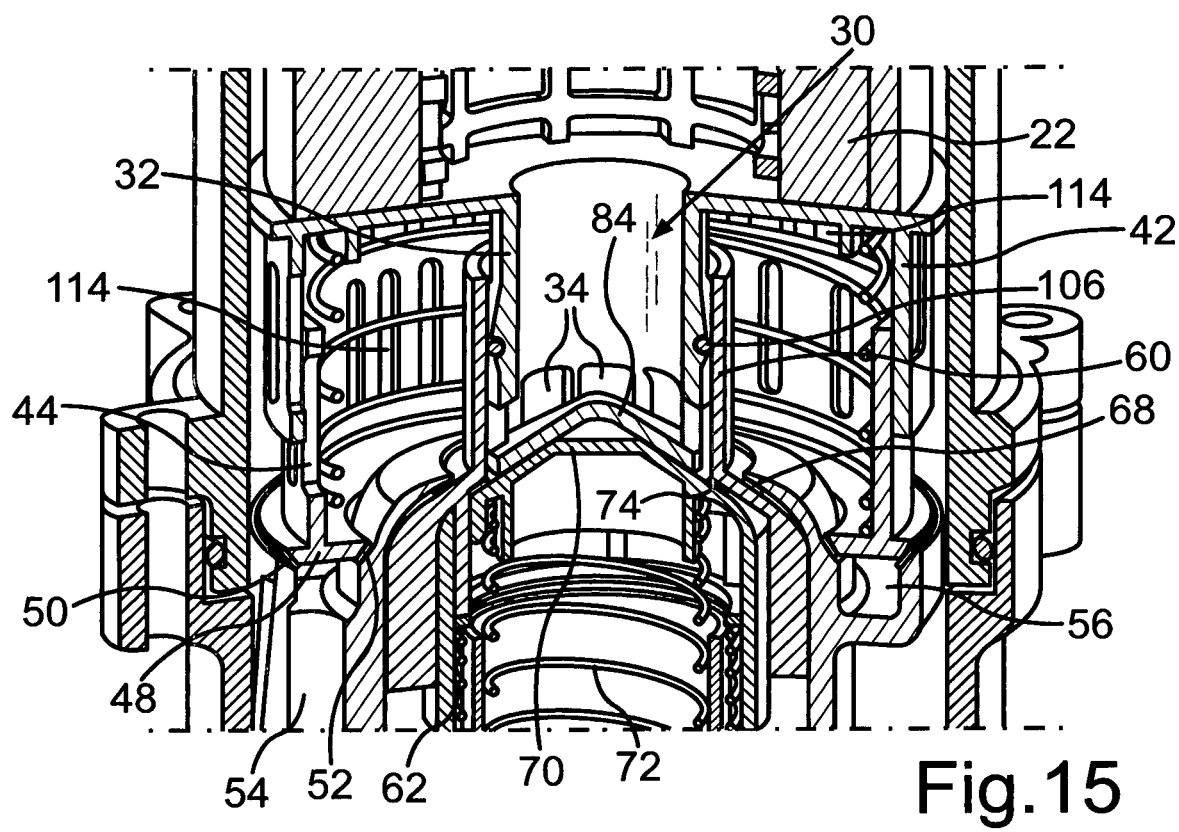
FIG. 15 illustrates in an enlarged sectional view, a possibility of the formation of an end region of a channel of the filter cartridge, wherein the end region of the channel is closed on the end side.
Figure 16:
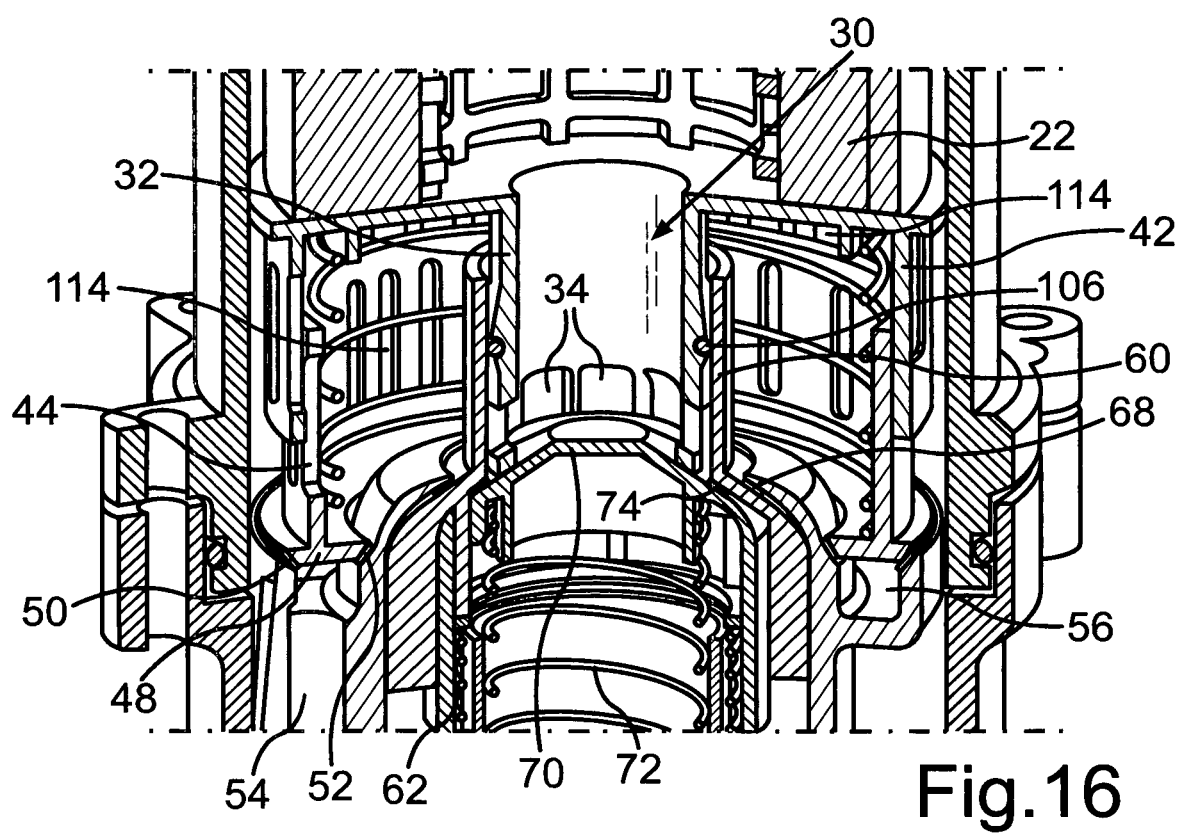
FIG. 16 illustrates a variant of the filter cartridge, wherein the end region of the channel is open on the end sides.
Figure 17:
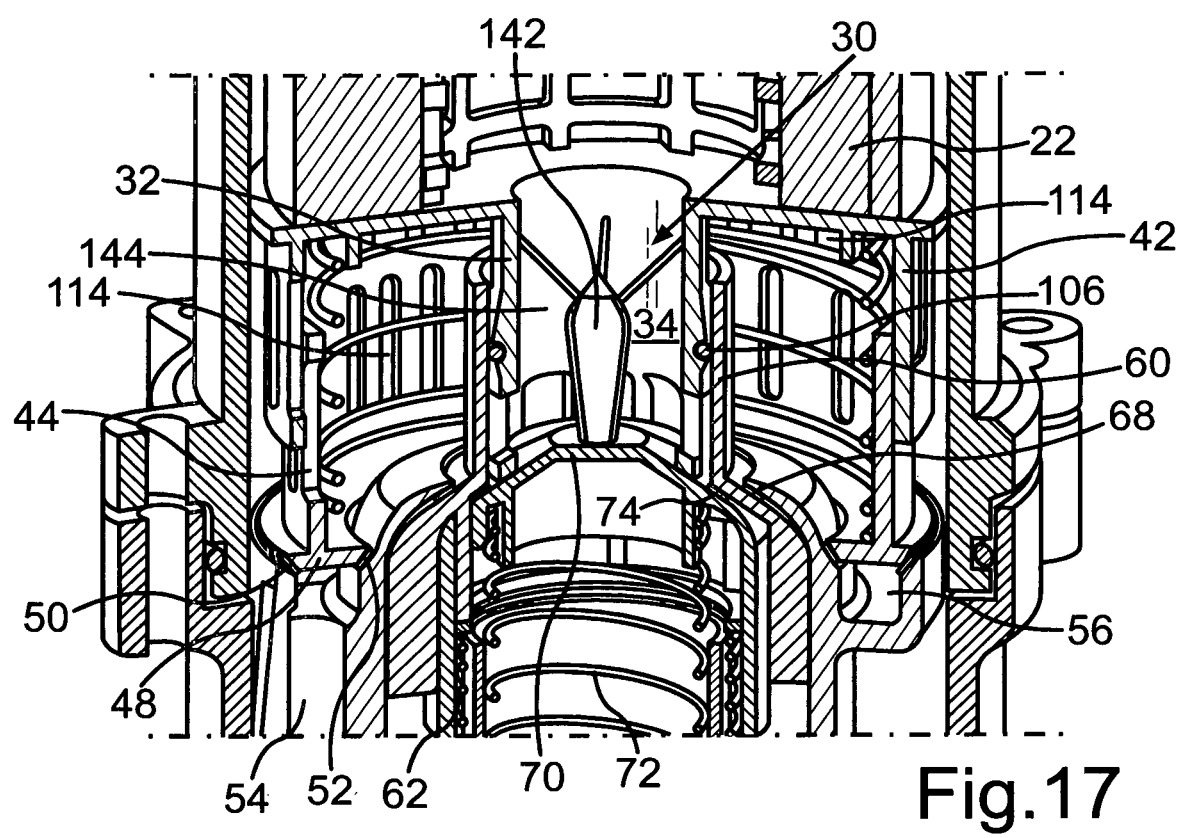
FIG. 17 illustrates a further variant of the filter cartridge, wherein a pressure piece is provided in the end region of the channel.

Further possible designs of the region 30 of the channel 20 shall be illustrated by means of FIG. 15 to FIG. 17. In FIG. 15, the region 30 of the filter cartridge 12 is further shows in an enlarged manner how it can be exemplarily used in the variants described with reference to FIG. 1 to FIG. 14. Correspondingly, the base part 84 is here formed to be closed.

In the embodiment of the region 30 shown in FIG. 16, a closed base part 84 is missing, and the socket-shaped region 30 having the through openings 34 is formed opening out to the closing device 70.

In the embodiment shown in FIG. 17, the region 30 is also formed to be open on its end side. However, here, in the center of the region 30, a pressure piece 142 is provided which abuts on the closing device 70 in the position of the filter cartridge 12 shown in FIG. 17. The wall 32 here comprises wall regions 144 running in a star-shaped manner towards the pressure piece 142 between which the through openings 34 are formed.

The invention claimed is:

1. An oil filter, comprising:
   a filter cartridge (12) which is disposed in an oil filter housing (14) of the oil filter (10), wherein the oil filter housing (14) includes a base body (16) and a covering element (18), wherein the filter cartridge (12) has a filter channel (20) for filtered oil which is surrounded at least regionally in a radial direction by a filter material (22) of the filter cartridge (12);
   wherein at least one through opening (34) is formed in a sleeve-shaped wall (32) disposed at a bottom end of the filter channel (20), wherein the filter cartridge (12) in the oil filter housing (14), in a closed state of the oil filter housing (14) in which the covering element (18) is mounted on the base body (16), is movable from a first position, in which an emergence of the filtered oil into a filtered oil channel (76) for the filtered oil provided on sides of the oil filter housing (14) is prevented, into a second position, in which the filter cartridge (12) is shifted in an axial direction (36) of the filter cartridge (12) in relation to the first position, and in which an inlet into the filtered oil channel (76) provided on the sides of the oil filter housing (14) is fluidically connected to the at least one through opening (34); and
   wherein a closing element (44) formed as a sleeve element (44) surrounding the sleeve-shaped wall (32) disposed at the bottom end of the filter channel (20) is pressed away from the filter cartridge (12) but shiftable relative to the sleeve-shaped wall (32) disposed at the bottom end of the filter channel (20) in the axial direction (36) of the filter cartridge (12), an outlet channel (54) for removing the filtered oil from a receiving region of the oil filter housing (14) for the filter cartridge (12) being closable via the sleeve element (44), wherein an inlet (56) of the outlet channel (54) is releasable by bringing the filter cartridge (12) into a dismantling position of the filter cartridge (12), in which the filter cartridge (12) is moved from the first position in a direction in opposition to the second position, in which a first end plate (26) of the filter cartridge (12) abuts on an end of the sleeve element.

2. The oil filter according to claim 1, wherein a spring element (46) is disposed on the filter cartridge (12), wherein via the spring element (46) the closing element (44) is supplied with a spring force of the spring element (46) in a position closing the inlet (56) of the outlet channel (54).

3. The oil filter according to claim 1, wherein the closing element (44) has at least one sealing element (50, 52) for sealing the inlet (56) of the outlet channel (54).

4. The oil filter according to claim 1, wherein the oil filter housing (14) has the outlet channel (54), wherein the inlet (56) of the outlet channel (54) is closed by the closing element (44) that is shiftable relative to the first end plate (26) of the filter cartridge (12) in the axial direction (36) of the filter cartridge (12) when the filter cartridge (12) is in the first position or in the second position.

5. The oil filter according to claim 2, wherein in a third position of the filter cartridge (12), in which the filter cartridge (12) is shifted further in the axial direction (36) of the filter cartridge (12) in relation to the second position, the first end plate (26) abuts on an upper end (108) of the closing element (44), wherein the spring element (46) is pressed together as far as the spring element can go.

6. The oil filter according to claim 1, wherein the oil filter housing (14) has a tubular receiver (60) in which a first region (30) of the filter channel (20) of the filter cartridge (12), which has the at least one through-opening (34), is received when the filter cartridge (12) is brought into the first position or into the second position, wherein the first region (30) of the filter channel (20) abuts on a closing device (70) at least in the first position and in the second position of the filter cartridge (12), which is movable away from the tubular receiver (60) by shifting the filter cartridge (12) out of the first position into the second position against a spring force of a check valve spring element (72) in order to release the inlet into the filtered oil channel (76) provided on the sides of the oil filter housing (14).

7. The oil filter according to claim 6, wherein the oil filter housing (14) has a stop for a bypass valve spring (62), which exerts a spring force on the filter cartridge (12) acting against a shifting direction when bringing the filter cartridge (12) into a third position in which the filter cartridge (12) is further shifted in the axial direction (36) of the filter cartridge (12) relative to the second position, wherein an unfiltered oil inlet for unfiltered oil into a base body channel (110, 92) is releasable by a movement of the tubular receiver (60) away from a wall (66) of the oil filter housing (14).

8. The oil filter according to claim 1, wherein the oil filter housing (14) has a stop for a bypass valve spring (62), which exerts a spring force on the filter cartridge (12) acting against a shifting direction when bringing the filter cartridge (12) into a third position, in which the filter cartridge (12) is further shifted in the axial direction (36) of the filter cartridge (12) relative to the second position, wherein an unfiltered oil inlet for the unfiltered oil into a base body channel (110, 92) can be released by moving a second region (120) of the filter channel (20) of the filter cartridge (12) having at least one further through opening (126) out of a receiver (130) for the second region (120) of the filter channel (20) having a further tubular inflow opening (138) for the unfiltered oil provided on sides of the covering element (18).

* * * * *